(12) United States Patent
Kilchyk

(10) Patent No.: US 12,076,930 B2
(45) Date of Patent: Sep. 3, 2024

(54) ADDITIVELY MANUFACTURING AN IMPELLER AND MOTOR ROTOR

(71) Applicant: Hamilton Sundstrand Corporation, Charlotte, NC (US)

(72) Inventor: Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 494 days.

(21) Appl. No.: 17/542,128

(22) Filed: Dec. 3, 2021

(65) Prior Publication Data

US 2023/0173759 A1 Jun. 8, 2023

(51) Int. Cl.
| | | |
|---|---|---|
| *B32B 41/00* | (2006.01) | |
| *B29C 64/141* | (2017.01) | |
| *B29C 64/386* | (2017.01) | |
| *B29L 31/08* | (2006.01) | |
| *B33Y 50/00* | (2015.01) | |
| *B33Y 80/00* | (2015.01) | |

(52) U.S. Cl.
CPC .......... *B29C 64/386* (2017.08); *B29C 64/141* (2017.08); *B29L 2031/08* (2013.01); *B33Y 50/00* (2014.12); *B33Y 80/00* (2014.12)

(58) Field of Classification Search
CPC . B29C 64/386; B29C 64/141; B29L 2031/08; B33Y 50/00; B33Y 80/00; B33Y 10/00; F04D 17/10; F04D 25/066; F04D 29/023; F04D 29/284; B22F 2998/10; B22F 5/009; B22F 10/20; C22C 2202/02; H02K 7/14; H02K 15/03; H02K 1/28

USPC .................... 156/60, 64, 350, 351, 378, 379
See application file for complete search history.

(56) References Cited

U.S. PATENT DOCUMENTS

| | | |
|---|---|---|
| 2,293,508 A | 8/1942 | Killam |
| 3,964,885 A | 6/1976 | Bottoms et al. |
| 5,470,208 A | 11/1995 | Kletschka |
| 5,547,350 A | 8/1996 | Rawal et al. |
| 5,928,131 A | 7/1999 | Prem |
| 6,254,361 B1 | 7/2001 | Sabini |
| 6,386,839 B1 | 5/2002 | Chuang |
| 7,131,823 B2 | 11/2006 | Kalavsky |
| 8,754,540 B2 | 6/2014 | Ives et al. |

(Continued)

FOREIGN PATENT DOCUMENTS

| | | |
|---|---|---|
| CN | 109595179 A | 4/2019 |
| CN | 209781228 U | 12/2019 |

(Continued)

OTHER PUBLICATIONS

Journal bearings and their lubrication (Year: 2014).

(Continued)

*Primary Examiner* — Michael N Orlando
*Assistant Examiner* — Joshel Rivera
(74) *Attorney, Agent, or Firm* — Kinney & Lange, P.A.

(57) ABSTRACT

A method of manufacturing an integral impeller and motor rotor. The method includes manufacturing an impeller with a shroud, modifying a radially outer surface of the shroud to prepare the radially outer surface for additive manufacturing, additively manufacturing a motor rotor onto the radially outer surface of the shroud such that the motor rotor has a magnetic field with a geometry designed by computer modeling, and magnetizing the rotor.

20 Claims, 9 Drawing Sheets

(56) References Cited

U.S. PATENT DOCUMENTS

| | | | |
|---|---|---|---|
| 10,711,789 | B2 | 7/2020 | Palomba et al. |
| 2007/0077155 | A1 | 4/2007 | Shah et al. |
| 2010/0040461 | A1 | 2/2010 | Sensel |
| 2015/0017013 | A1 | 1/2015 | Tozzi et al. |
| 2017/0047793 | A1 | 2/2017 | Klassen et al. |
| 2017/0266728 | A1* | 9/2017 | Johnson ............... B22D 23/003 |
| 2018/0051709 | A1 | 2/2018 | Pulnikov et al. |
| 2019/0003322 | A1* | 1/2019 | Rettberg ................ F01D 5/043 |

FOREIGN PATENT DOCUMENTS

| | | |
|---|---|---|
| CN | 214887730 U | 11/2021 |
| DE | 19608602 A1 | 9/1997 |
| EP | 2725232 A2 | 4/2014 |
| EP | 3629454 A1 | 4/2020 |
| RU | 2343318 C1 | 1/2009 |
| WO | 2021144791 A1 | 7/2021 |

OTHER PUBLICATIONS

Partial European Search Report for European Patent Application No. 22211212.0, dated Sep. 4, 2023, 18 pages.

Wu et al: "Toward Additively Manufactured Electrical Machines: Opportunities and Challenges," Electrical and Computer Engineering Faculty Research and Publications, Marquette University, Mar. 2020, 32 pages.

Wu et al: "Towards Fully Additively-Manufactured Permanent Magnet Synchronous Machines: Opportunities and Challenges," Electrical and Computer Engineering Faculty Research and Publications, Marquette University, May 2019, 23 pages.

Extended European Search Report for European Patent Application No. 22210038.0, dated Apr. 18, 2023, 8 pages.

* cited by examiner

ADDITIVELY MANUFACTURING AN IMPELLER AND MOTOR ROTOR

CROSS-REFERENCE TO RELATED APPLICATION(S)

This application is related to U.S. application Ser. No. 17/542,121, filed on Dec. 3, 2021, entitled "SHAFTLESS ROTARY MACHINE," the disclosure of which is incorporated by reference in its entirety.

BACKGROUND

This application relates to a method of manufacturing an impeller and motor rotor and, more particularly, to additively manufacturing an impeller and motor rotor used in a rotary machine.

Additive manufacturing is building components by depositing material in layers. Additive manufacturing can create parts with complex designs and allows for fast prototyping. Multiple materials can be used to additively manufacture a component.

Rotary machines, such as compressors, are used in aircraft for air treatment. The typical layout of such a rotary machine has an impeller driven by a motor. A shaft connects the motor and the impeller. Airline safety guidelines require containment housing around both the motor and the impeller in case either component disintegrates. A rotary machine with a shaft and motor is large and requires a lot of heavy containment. Heavy and large equipment is not desirable in aircraft.

SUMMARY

A method of manufacturing an integral impeller and motor rotor. The method includes manufacturing an impeller with a shroud, modifying a radially outer surface of the shroud to prepare the radially outer surface for additive manufacturing, additively manufacturing a motor rotor onto the radially outer surface of the shroud such that the motor rotor has a magnetic field with a geometry designed by computer modeling, and magnetizing the rotor.

A method of manufacturing a monolithic impeller and motor rotor. The method includes additively manufacturing an impeller with a shroud and a motor rotor on a radially outer surface of the shroud and magnetizing the motor rotor. The motor rotor has a magnetic field with a geometry designed using computer modeling.

A method of manufacturing a shaftless rotary machine. The method includes manufacturing a housing with an inlet, an outlet, and a duct extending from the inlet to the outlet; additively manufacturing a motor stator on an inner surface of the housing; manufacturing an impeller with a shroud and a motor rotor on the shroud; and mounting the impeller in the housing with a clearance between the motor rotor adjacent to the motor stator.

DETAILED DESCRIPTION

Figure 1:
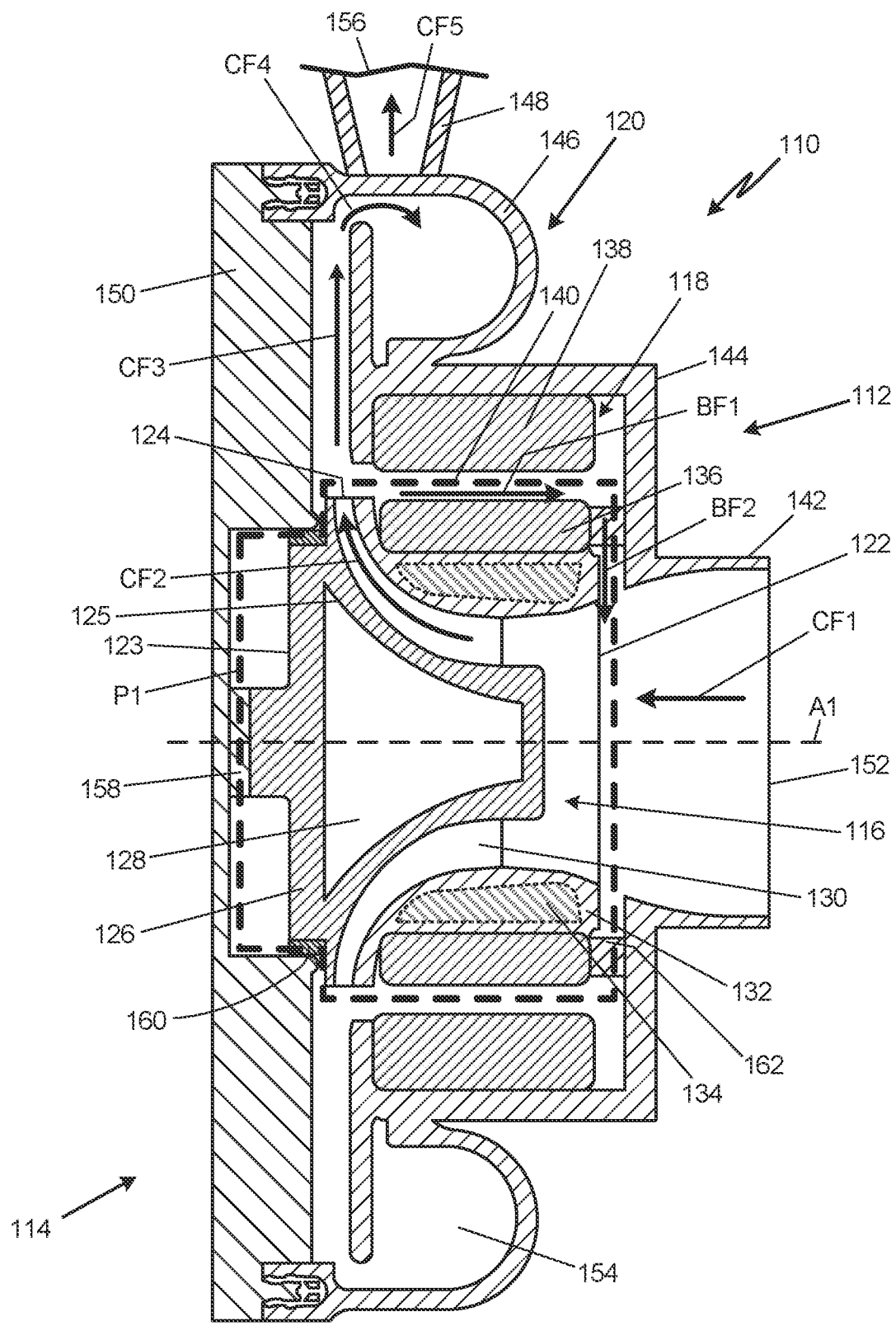
FIG. 1 is a cross-sectional view of a first embodiment of a shaftless compressor.

FIG. 1 is a cross-sectional view of shaftless compressor 110. Compressor 110 is one example of a rotary machine with the disclosed configuration. Those in the art will understand that compressor 110 could be a turbine, a combined compressor and turbine, or any other rotary machine with an electric motor. Compressor 110 includes first side 112, second side 114, impeller 116, motor 118, and housing 120. Impeller 116 includes first side 122, second side 123, radially outer side 124, radially inner side 125, hub 126 with weight reduction area 128, blades 130, and shroud 132. Shroud 132 has weight reduction area 134. Motor 118 includes rotor 136, stator 138, and air gap 140. Housing 120 includes inlet housing 142, motor housing 144, duct housing 146 outlet housing 148 and backing plate 150. Housing 120 also includes inlet 152, duct 154, and outlet 156. Shaftless compressor 110 also includes thrust bearing 158, first journal bearing 160, and second journal bearing 162. FIG. 1 also shows axis A1, rotating portion P1, arrow CF1, arrow CF2, arrow CF3, arrow CF4, arrow CF5, arrow BF1, and arrow BF2.

Compressor 110 is oriented in FIG. 1 so first side 112 is on the right and second side 114 is on the left. Compressor 110 has impeller 116 with motor 118 radially outward from impeller 116. Impeller 116 and motor 118 are encased by housing 120.

Impeller 116 includes first side 122, second side 123, radially outer side 124, radially inner side 125, hub 126 with weight reduction area 128, blades 130, and shroud 132 with weight reduction area 134. First side 122 of impeller 116 is near first side 112 of compressor 110. Second side 123 of impeller 116 is opposite first side 122 near second side 114 of compressor 110. Radially outer side 124 of impeller 116 is positioned radially away from axis A1 of compressor 110. Radially inner side 125 of impeller 116 is opposite radially outer side 124. Hub 126 is as hollow at weight reduction area 128. Weight reduction area 128 can alternatively include hollow spaces instead of being hollow. The hollow spaces can have various designs to increase the structural integrity of hub 126 while reducing the weight. Such designs can include, for example, weight reduction area 128 being porous, having cavities, or having hollow spaces in a lattice pattern among other common weight reduction designs. Blades 130 connect to and extend radially outward from hub 126. Shroud 132 connects to blades 130 opposite hub 126. Shroud 132 includes weight reduction area 134. Weight reduction area 134 is a portion of shroud 132 that can have various configurations depending on structural and weight reduction needs. For instance, weight reduction area 134 can be hollow, porous, have cavities, or have hollow spaces in a lattice design.

Motor 118 includes rotor 136, stator 138, and air gap 140. A radially inner side of rotor 136 connects to a radially outer surface of shroud 132 of impeller 116 near weight reduction area 134. Shroud 132 is designed to fit rotor 136. Rotor 136 can be additively manufactured onto impeller 116 so that rotor 136 and impeller 116 are one integral component. An integral component has a first sub-component additively manufactured onto a second sub-component that was made using a separate manufacturing process from the additive manufacturing process creating the first sub-component. Alternatively, rotor 136 and impeller 116 can be additively manufactured so that rotor 136 and impeller 116 are one monolithic component. A monolithic component is made completely with additive manufacturing, especially where the component has sub-components that could be separately manufactured and later joined.

Stator 138 surrounds rotor 136 so that a radially inner surface of stator 138 faces a radially outer surface of rotor 136. Air gap 140 is between rotor 136 and stator 138. Air gap 140 fluidly connects to a primary flow path through compressor 110. A radially outer side of stator 138 connects to housing 120.

Housing 120 includes inlet housing 142, motor housing 144, duct housing 146, outlet housing 148 and backing plate 150. Inlet housing 142 is on first side 112 of compressor 110. Inlet housing 142 connects to motor housing 144. Motor housing 144 has a first portion that extends radially outward from inlet housing 142 along first side 112 of compressor 110. Motor housing 144 has a second portion that is radially outward from and connects to stator 138. Duct housing 146 connects to the second portion of motor housing 144. Duct housing 146 is radially outward from impeller 116 and motor 118. Duct housing 146 partially surrounds impeller 116 and motor 118. Outlet housing 148 extends from duct housing 146. Backing plate 150 is near second side 114 of compressor 110. Backing plate 150 connects to duct housing 146 opposite of motor housing 144. In the embodiment shown in FIG. 1, inlet housing 142, motor housing 144, duct housing 146, and outlet housing 148 are a single component. Inlet housing 142, motor housing 144, duct housing 146, and outlet housing 148 could be integrally formed, monolithically formed, or cast as a single component.

Housing 120 also includes inlet 152, duct 154, and outlet 156. Inlet 152 is at first side 112 of compressor 110 in inlet housing 142. Air can enter compressor 110 through inlet 152. Inlet 152 fluidly connects to duct 154. Duct 154 extends from inlet 152 to outlet 156. Outlet 156 fluidly connects to duct 154. Air can exit compressor 110 through outlet 156. Outlet 156 located in outlet housing 148. Inlet 152 is an upstream portion of compressor 110 and outlet 156 is a downstream portion of compressor 110.

Compressor 110 also includes thrust bearing 158, first journal bearing 160, and second journal bearing 162. Thrust bearing 158 is between impeller 116 and backing plate 150. First journal bearing 160 is between hub 126 of impeller 116 and backing plate 150. Second journal bearing 162 is between rotor 136 and motor housing 144. Bearing arrangements in compressor 110 can change depending on the configuration of weight reduction portion 128 in hub 126.

FIG. 1 also includes a dotted line that demarcates rotating portion P1. Rotating portion P1 includes impeller 116 and rotor 136. Axis A1 runs through impeller 116 and is an axis of rotation. FIG. 1 also includes a compressive flow path, represented by arrows CF1-CF5, and a bypass flow path, represented by arrows BF1-BF2. Arrow CF1 is in inlet housing 142 between inlet 152 and first side 122 of impeller 116. Arrow CF2 is through impeller 116 along blades 130. Arrow CF3 is between backing plate 150 and a portion of duct housing 146. Arrow CF4 is entering a portion of duct 154 within duct housing 146. Arrow CF5 is in outlet housing 148. Arrow BF1 is in air gap 140 moving toward first side 112 of compressor 110. Arrow BF2 is between rotor 136 and motor housing 144.

Motor 118 rotates impeller 116 to compress air in compressor 110. The air enters compressor 110 through inlet 152. The air moves along the compressive flow path following arrow CF1 through inlet housing 142 towards impeller 116. Motor 118 rotates rotor 136 within stator 138. Rotor 136 rotates impeller 116 around axis A1. Thrust bearing 158, first journal bearing 160, and second journal bearing 162 support impeller 116 within compressor 110 so that impeller 116 can rotate with rotor 136. The air enters impeller 116 and follows arrow CF2 through blades 130. Rotation of impeller 116 and blades 130 increases the velocity of the air. The air exits impeller 116 at radially outer side 124 of impeller 116. As the air exits impeller 116, the air is either energized or de-energized. Energized air continues to flow along the compressive flow path. The energized air follows arrow CF3 from radially outer side 124 of impeller 116. The energized air then moves into the portion of duct 154 within duct housing 146 following arrow CF4. The velocity of the energized air decreases and the air pressure increases as the energized air moves through the portion of duct 154 within duct housing 146. Higher pressure air exits compressor 110 at outlet 156.

De-energized air from impeller 116 moves in a vortex as it exits impeller 116 and flows along the bypass flow path. The de-energized air moves through air gap 140 following arrow BF1. The de-energized air moves from air gap 140 and flows through an opening between rotor 135 and motor housing 144 following arrow BF2. The de-energized air then moves from air gap 140 into a portion of duct 154 within inlet housing 142. The de-energized air is then incorporated with air from inlet 152 and moves along compressive flow path following arrow CF1. Motor housing 144 and duct housing 146 are containment for impeller 116 and motor 118 so that compressor 110 meets safety standards for use in aircraft.

Compressor 110 has several features that help reduce weight and increase efficiency when compared with a shaft-driven rotary machine. First, impeller 116 has shroud 132. Including shroud 132 on impeller 116 reduces the need for tip clearance between blades 130 and other non-rotational portions of housing 120. Shroud 132 also keeps air from leaking over tops of blades 130. Having tip clearance and subsequent air leakage decrease the power output of compressors without shrouded impellers. Including shroud 132 makes compressor 110 more efficient.

Next, including shroud 132 allows for blades 130 to be thinner than blades in a shaft-driven rotary machine. Centrifugal forces from spinning impeller 116 push blades 130 into shroud 132. Blades 130 compress when forced into shroud 132. Metal is about three times stronger when compressed than when expanded. Blades on an impeller without a shroud expand away from a hub, requiring thick blades to increase structural stability of the shroudless impeller. Blades 130 of impeller 116 are thinner than blades on the impeller without the shroud because blades 130 compress against shroud 132 when impeller 116 rotates. When blades 130 are thin, the weight of impeller 116 is low. A low-weight impeller, like impeller 116, reduces the amount of energy necessary to turn the impeller and reduces the amount of containment necessary to comply with air safety standards. Less containment means compressor 110 is lighter and better for use in aircraft. Including shroud 132 increases the efficiency and decreases the weight of compressor 110.

Hub 126 of impeller 116 is designed to increase power output and decrease the weight of compressor 110 because there is no shaft to which hub 126 need connect. When hub 126 includes weight reduction area 128, hub 126 weighs less than a shaft-mounted hub and requires less containment. Impeller 116 can also be designed with a small-diameter hub near first side 122 of impeller 116 because hub 126 does not have to fit around a shaft. Having to fit the shaft into a hub limits the minimum size the hub can be. Without the shaft, hub 126 can have a very small upstream hub diameter near first side 122 of impeller 116. Reducing the upstream hub diameter of hub 126 increases the efficiency of compressor 110. Work done on air through a compressor is proportional to the ratio of an upstream diameter of the hub and a downstream diameter of the hub. In hub 126, the upstream hub diameter can be made very small compared to a downstream hub diameter located at radially outer side 124 of impeller 116. Therefore, compared to a similarly sized impeller mounted on a shaft, upstream hub diameter of hub 126 can be very small and impeller 116 can do more work without increasing the overall size of impeller 116. This makes compressor 110 efficient. Hub 126 of impeller 116 has a light design that produces more work than shaft-driven impellers. This means compressor 110 is lighter and more efficient than shaft-driven compressors.

Compressor 110 requires less containment than the shaft-driven compressor because motor 118 surrounds impeller 116. The shaft-driven compressor requires containment around a motor and an impeller because the two portions of the machine are separated by a large space. Housing 120 can act as containment for both motor 118 and impeller 116 because motor 118 encircles impeller 116, making compressor 110 very compact. Compressor 110 requires containment for motor 118 and impeller 116 in one area. This means compressor 110 is lighter than the shaft-driven compressor.

Motor 118 also produces less torque than the shaft-driven compressor. A radius from axis A1 to the radially outer surface of rotor 136 is much larger than a comparable radius from an axis in the shaft-driven compressor to a radially outer surface of a rotor mounted on the shaft. As such, rotor 136 and stator 138 have large flux surfaces compared to the motor in the shaft-driven compressor. The increased flux surfaces decrease the torque motor 118 produces while running. The decreased torque means the cross sections of rotor 136 and stator 138 are much smaller than a motor in a shaft-driven compressor but still produce the same amount of power as the shaft-driven compressor motor. A smaller cross section motor, such as motor 118, means compressor 110 is very compact, decreases the weight of motor 118, and reduces the containment necessary in compressor 110.

The bypass flow path through motor 118 acts as both a casing bypass to extend the range of compressor 110 and as a cooling path. The bypass flow path removes vortexes and other turbulent air created by de-energized air that runs along shroud 132. Vortexes and turbulent air reduce the performance of compressor 110. Air flowing through air gap 140 also cools motor 118.

Figure 2:
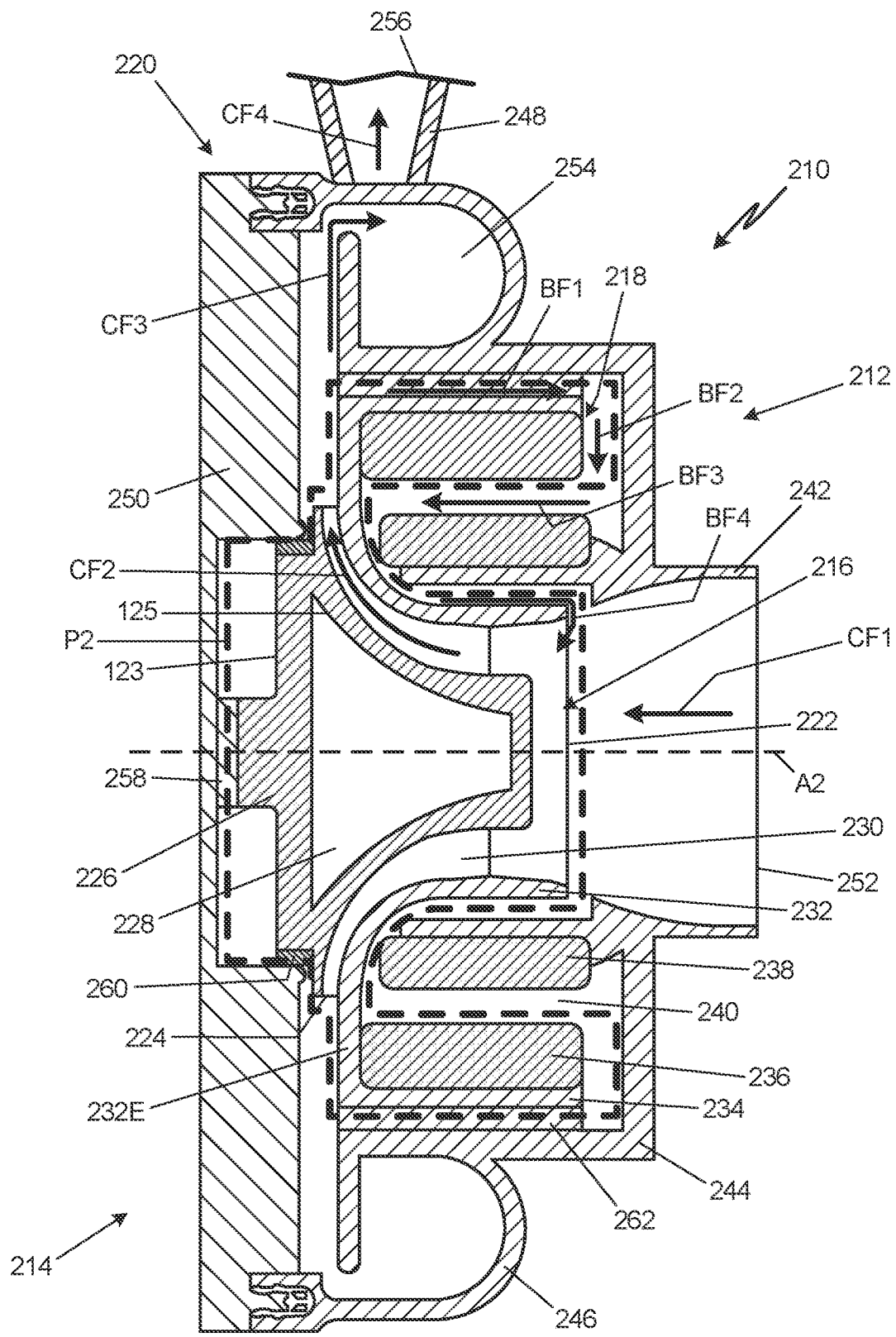
FIG. 2 is a cross-sectional view of a second embodiment of a shaftless compressor.

FIG. 2 is a cross-sectional view of shaftless compressor 210. Compressor 210 is one example of a rotary machine with the disclosed configuration. Those in the art will understand that compressor 210 could be a turbine, a combined compressor and turbine, or any other rotary machine with an electric motor. Compressor 210 includes first side 212, second side 214, impeller 216, motor 218, and housing 220. Impeller 216 includes first side 222, second side 223, radially outer side 224, radially inner side 225, hub 226 with weight reduction area 228, blades 230, and shroud 232.

Shroud 232 has extended edge 232E and flange 234. Motor 218 includes rotor 236, stator 238, and air gap 240. Housing 220 includes inlet housing 242, motor housing 244, duct housing 246, outlet housing 248, and backing plate 250. Housing 220 also includes inlet 252, duct 254, and outlet 256. Shaftless compressor 210 also includes thrust bearing 258, first journal bearing 260, and second journal bearing 262. FIG. 2 also shows axis A2, rotating portion P2, arrow CF1, arrow CF2, arrow CF3, arrow CF4, arrow BF1, arrow BF2, arrow BF3, and arrow BF4.

Compressor 210 is oriented in FIG. 2 so first side 212 is on the right and second side 214 is on the left. Compressor 210 has impeller 216 with motor 218 radially outward from impeller 216. Impeller 216 and motor 218 are encased by housing 220.

Impeller 216 includes first side 222, radially outer side 224, hub 226 with weight reduction area 228, blades 230, and shroud 232 with extended edge 232E and flange 234. First side 222 of impeller 216 is near first side 212 of compressor 210. Second side 223 of impeller 216 is near second side 214 of compressor 210. Radially outer side 224 of impeller is positioned radially away from axis A1 of compressor 210. Radially outer side 224 of impeller 216 is a downstream portion of impeller 216. Radially inner side 225 of impeller 216 is opposite radially outer side 224. Hub 226 is hollow at weight reduction area 228. Weight reduction area 228 can alternatively include hollow spaces instead of being hollow. The hollow spaces can have various designs to increase the structural integrity of hub 226 while reducing the weight. Such designs can include, for example, weight reduction area 228 being porous, having cavities, or having hollow spaces in a lattice pattern, among other common weight reduction designs. Blades 230 connect to and extend radially outward from hub 226. Shroud 232 connects to blades 230 opposite hub 226. Shroud 232 has extended edge 232E which extends from radially outer side 224 of impeller 216 radially outward from motor 218. Flange 234 protrudes from extended edge 232E and is located radially outward from shroud 232.

Motor 218 includes rotor 236, stator 238, and air gap 240. A radially outer side of rotor 236 connects to shroud 232 of impeller 216 at a radially inner surface of flange 234. Flange 234 fits rotor 236. Rotor 236 and impeller 216 can be additively manufactured so that rotor 236 and impeller 216 are a monolithic component. Alternatively, rotor 236 can be additively manufactured onto shroud 232 so that rotor 236 and impeller 216 are an integral component. Stator 238 is within rotor 236 so that a radially outer surface of stator 238 faces a radially inner surface of rotor 236. Air gap 240 is between rotor 236 and stator 238. Air gap 240 fluidly connects to a primary flow path through compressor 210. A radially inner side of stator 238 connects to housing 220.

Housing 220 includes inlet housing 242, motor housing 244, duct housing 246, outlet housing 248 and backing plate 250. Inlet housing 242 is on first side 212 of compressor 210. Inlet housing 242 extends into compressor 210 and connects to the radially inner side of stator 238. Inlet housing 242 connects to motor housing 244 near a middle portion of inlet housing 242. Motor housing 244 has a first portion that extends radially outward from inlet housing 242 along first side 212 of compressor 210. Motor housing 244 has a second portion that is radially outward from motor 218. Duct housing 246 connects to the second portion of motor housing 244. Duct housing 246 is radially outward from impeller 216 and motor 218. Duct housing 246 partially surrounds impeller 216 and motor 218. Outlet housing 248 extends from duct housing 246. Backing plate 250 is near second side 214 of compressor 210. Backing plate 250 connects to a second side of duct housing 246. In the embodiment shown in FIG. 2, inlet housing 242, motor housing 244, duct housing 246, and outlet housing 248 are a single component. Inlet housing 242, motor housing 244, duct housing 246, and outlet housing 248 could be integrally formed, monolithically formed, or cast as a single component.

Housing 220 also includes inlet 252, duct 254, and outlet 256. Inlet 252 is at first side 212 of compressor 210 in inlet housing 242. Air can enter compressor 210 through inlet 252. Inlet 252 fluidly connects to duct 254. Duct 254 extends from inlet 252 to outlet 256. Outlet 256 fluidly connects to duct 254. Air can exit compressor 210 through outlet 256. Outlet 256 is located in outlet housing 248. Inlet 252 is an upstream portion of compressor 210 and outlet 256 is a downstream portion of compressor 210.

Compressor 210 also includes thrust bearing 258, first journal bearing 260, and second journal bearing 262. Thrust bearing 258 is between impeller 216 and backing plate 250. First journal bearing 260 is between hub 226 of impeller 216 and backing plate 250. Second journal bearing 262 is between flange 234 and motor housing 244. Bearing arrangements in compressor 210 can change depending on the configuration of weight reduction portion 228 in hub 226.

FIG. 2 also includes a dotted line that demarcates rotating portion P2. Rotating portion P2 includes impeller 216 and rotor 236. Axis A2 runs through impeller 216 and is an axis of rotation. FIG. 2 also includes a compressive flow path, represented by arrows CF1-CF4, and a bypass flow path, represented by arrows BF1-BF4. Arrow CF1 is in inlet housing 242 between inlet 252 and first side 222 of impeller 216. Arrow CF2 is through impeller 216 along blades 230. Arrow CF3 is between backing plate 250 and a portion of duct housing 246. Arrow CF4 is in outlet housing 248. Arrow BF1 is through second journal bearing 262 between flange 234 and the second portion of motor housing 244. Arrow BF2 is between the first portion of motor housing 244 and rotor 236. Arrow BF3 is in air gap 240 moving toward second side 214 of compressor 210. Arrow BF4 is mainly between shroud 232 and inlet housing 242 and extends past first side 222 of impeller 216.

Motor 218 rotates impeller 216 to compress air in compressor 210. The air enters compressor 210 through inlet 252. The air moves along the compressive flow path following arrow CF1 through inlet housing 242 towards first side 222 of impeller 216. Motor 218 rotates rotor 236 around stator 238. Rotor 236 rotates impeller 216 around axis A2. Flange 234 supports rotor 236 within compressor 210 while rotating. Thrust bearing 258, first journal bearing 260, and second journal bearing 262 support impeller 216 within compressor 210 so that impeller 216 can rotate with rotor 236. The air enters impeller 216 and follows arrow CF2 through blades 230. Rotation of impeller 216 and blades 230 increases the velocity of the air. The air exits impeller 216 at radially outer side 224 of impeller 216. As the air exits impeller 216, the air is either energized or de-energized. Energized air continues to flow along the compressive flow path. The energized air follows arrow CF3 from radially outer side 224 of impeller 216 into the portion of duct 254 within duct housing 246. The velocity of the energized air decreases and the air pressure increases as the energized air moves through the portion of duct 254 within duct housing 246. Higher pressure air exits compressor 210 at outlet 256 following arrow CF4.

De-energized air from impeller 216 moves in a vortex as it exits impeller 216 and flows along bypass flow path. The de-energized air moves through second journal bearing 262 between flange 234 and motor housing 244 following arrow BF1. The de-energized air then flows toward air gap 240 between rotor 236 and motor housing 244 following arrow BF2. The de-energized air then follows arrow BF3 through air gap 240. Following arrow BF4, the de-energized air moves into a portion of duct 254 between inlet housing 242 and a radially outer surface of shroud 232 of impeller 216. The de-energized air moves through first side 222 of impeller 216 and mixes with air from inlet 252. The de-energized air and along compressive flow path again following arrow CF1. Motor housing 244 and duct housing 246 are containment for impeller 216 and motor 218 so that compressor 210 meets safety standards for use in aircraft.

Compressor 210 has the same features discussed in relation to compressor 110 (shown in FIG. 1). These features reduce the weight and increase the efficiency of compressor 210 compared to the shaft-driven air compressor. First, impeller 216 has several design features that reduce the weight and increase the efficiency of compressor 210 including covering impeller 216 with shroud 232, using thin blades for blades 230, decreasing the diameter of first side 222 of impeller 216 at hub 226, and employing other weight reduction methods when designing hub 226. Further, motor 218 requires less containment and creates less torque due to the placement of rotor 236 and stator 238 radially outward from impeller 216. The bypass flow path creates a casing bypass that cools motor 218 and extends the operating range of compressor 210. Compressor 210 also includes flange 234 which supports rotor 236. Centrifugal forces push rotor 236 radially outward when impeller 216 is spinning. Flange 234 connects to the radially outer surface of rotor 236, providing support against centrifugal force.

Figure 3:
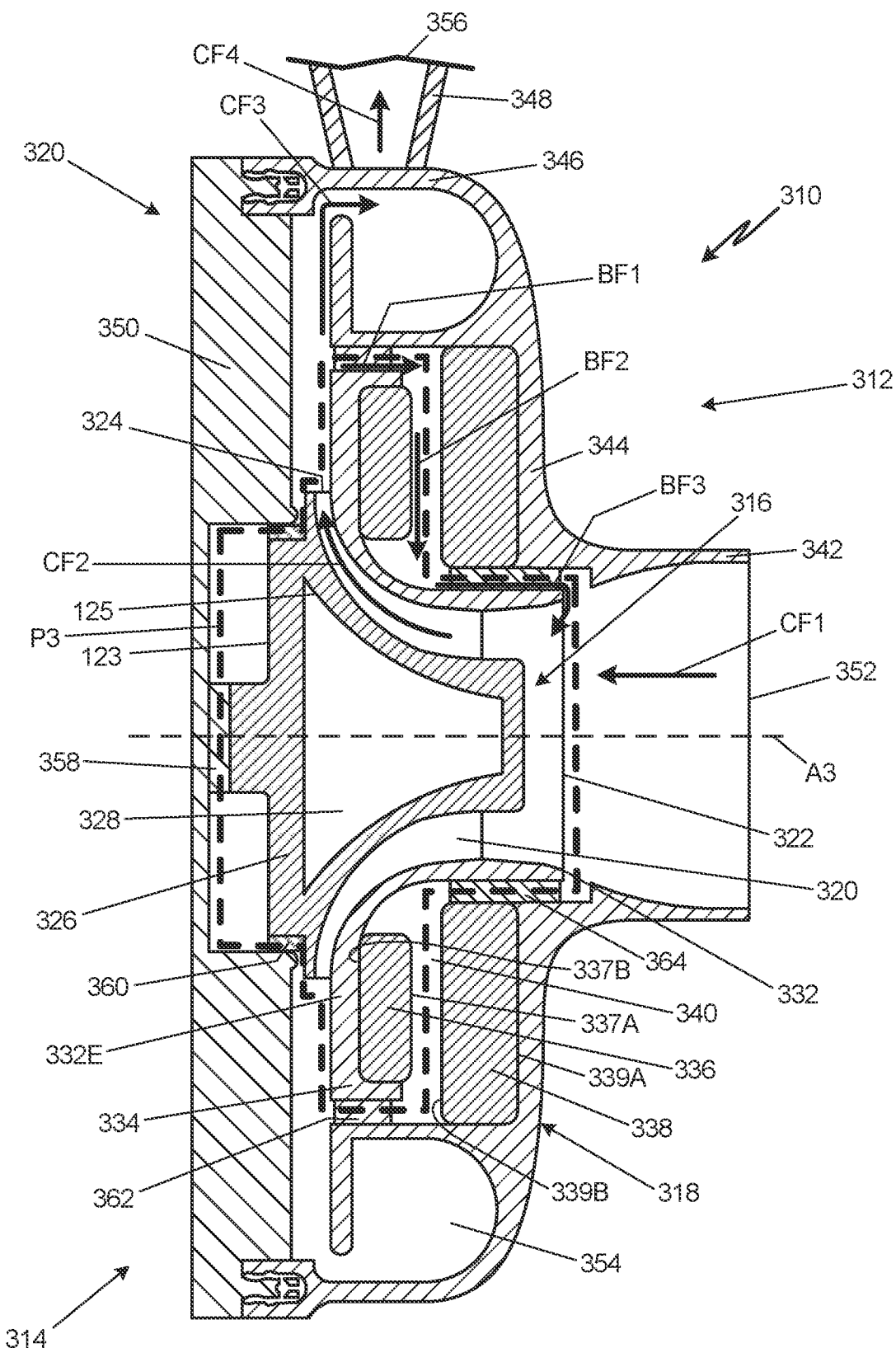
FIG. 3 is a cross-sectional view of a third embodiment of a shaftless compressor.

FIG. 3 is a cross-sectional view of shaftless compressor 310. Compressor 310 is one example of a rotary machine with the disclosed configuration. Those in the art will understand that compressor 310 could be a turbine, a combined compressor and turbine, or any other rotary machine with an electric motor. Compressor 310 includes first side 312, second side 314, impeller 316, motor 318, and housing 320. Impeller 316 includes first side 322, second side 323, radially outer side 324, radially inner side 325, hub 326 with weight reduction area 328, blades 330, and shroud 332. Shroud 332 has extended edge 332E and flange 334. Motor 318 includes rotor 336 with first side 337A and second side 337B, stator 338 with first side 339A and second side 339B, and air gap 340. Housing 320 includes inlet housing 342, motor housing 344, duct housing 346, outlet housing 348 and backing plate 350. Housing 320 also includes inlet 352, duct 354, and outlet 356. Shaftless compressor 310 also includes thrust bearing 358, first journal bearing 360, second journal bearing 362, and third journal bearing 364. FIG. 3 also shows axis A3, rotating portion P3, arrow CF1, arrow CF2, arrow CF3, arrow CF4, arrow BF1, arrow BF2, arrow BF3, and arrow BF4.

Compressor 310 is oriented so in FIG. 3 first side 312 is on the right and second side 314 is on the left. Compressor 310 has impeller 316 with motor 318 radially outward from impeller 316. Impeller 316 and motor 318 are encased by housing 320.

Impeller 316 includes first side 322, radially outer side 324, hub 326 with weight reduction area 328, blades 330, and shroud 332 with flange 334. First side 322 of impeller 316 is on first side 312 of compressor 310. First side 322 is an upstream side of impeller 316. Second side 323 is opposite first side 322 of impeller 316. Second side 323 of impeller 316 is near second side 314 of compressor 310.

Radially outer side 324 of impeller 316 is positioned radially away from axis A1 of compressor 310. Radially outer side 324 of impeller 316 is a downstream portion of impeller 316. Radially inner side 325 of impeller 316 is opposite radially outer side 324. Hub 326 is hollow at weight reduction area 328. Weight reduction area 328 can alternatively include hollow spaces instead of being hollow. The hollow spaces can have various designs to increase the structural integrity of hub 326 while reducing the weight. Such designs can include, for example, weight reduction area 328 being porous, having cavities, or having hollow spaces in a lattice pattern, among other common weight reduction designs. Blades 330 connect to and extend radially outward from hub 326. Shroud 332 connects to blades 330 opposite hub 326. Shroud 332 has extended edge 332E which extends from radially outer side 324 of impeller 316 radially outward from motor 318. Flange 334 protrudes from extended edge 332E and is located radially outward from shroud 332.

Motor 318 includes rotor 336 with first side 337A and second side 337B; stator 338 with first side 339A and second side 339B; and air gap 340. Rotor 336 has first side 337A near first side 312 of compressor 310. Second side 337B of rotor 336 is a rear surface of rotor 336 opposite first side 337A. Second side 337B of rotor 336 connects to extended edge 332E of shroud 332. A radially outer side of rotor 336 connects to flange 334. Rotor 336 and impeller 316 can be additively manufactured so that rotor 336 and impeller 316 are a monolithic component. Alternatively, rotor 336 can be additively manufactured onto shroud 332 so that rotor 336 and impeller 316 are an integral component. Stator 338 includes first side 339A near first side 312 of compressor 310. Second side 339B of stator 338 is opposite first side 339A and near second side 314 of compressor 310. Second side 339B of stator 338 is adjacent to first side 337A of rotor 336. A radially inner surface of stator 338 is adjacent to a radially outer surface of shroud 332 of impeller 316. Air gap 340 is between rotor 336 and stator 338. Air gap 340 fluidly connects to a primary flow path through compressor 310. First side 339A of stator 338 connects to housing 320 near front side 312 of compressor 310.

Housing 320 includes inlet housing 342, motor housing 344, duct housing 346, outlet housing 348 and backing plate 350. Inlet housing 342 is on first side 312 of compressor 310. Inlet housing 342 connects to motor housing 344. Motor housing 344 has a first portion that extends radially outward from inlet housing 342 along first side 312 of compressor 310. Motor housing 344 has a second portion that is radially outward from motor 318. Duct housing 346 connects to the second portion of motor housing 344. Duct housing 346 is radially outward from impeller 316 and motor 318. Duct housing 346 partially surrounds impeller 316 and motor 318. Outlet housing 348 extends from duct housing 346. Backing plate 350 is near second side 314 of compressor 310. Backing plate 350 connects to a second side of duct housing 346. In the embodiment shown in FIG. 3, inlet housing 342, motor housing 344, duct housing 346, and outlet housing 348 are a single component. Inlet housing 342, motor housing 344, duct housing 346, and outlet housing 348 could be integrally formed, monolithically formed, or cast as a single component.

Housing 320 also includes inlet 352, duct 354, and outlet 356. Inlet 352 is at first side 312 of compressor 310 in inlet housing 342. Air can enter compressor 310 through inlet 352. Inlet 352 fluidly connects to duct 354. Duct 354 extends from inlet 352 to outlet 356. Outlet 356 fluidly connects to duct 354. Air can exit compressor 310 through outlet 356. Outlet 356 is located in outlet housing 348. Inlet 352 is an upstream portion of compressor 310 and outlet 356 is a downstream portion of compressor 310.

Compressor 310 also includes thrust bearing 358, first journal bearing 360, and second journal bearing 362. Thrust bearing 358 is between impeller 316 and backing plate 350. First journal bearing 360 is between hub 326 of impeller 316 and backing plate 350. Second journal bearing 362 is between flange 334 and motor housing 344. Third journal bearing 364 has a radially inner side adjacent to shroud 332 and a radially outer side adjacent to stator 338 and motor housing 344. Bearing arrangements in compressor 310 can change depending on the configuration of weight reduction portion 328 in hub 326.

FIG. 3 also includes a dotted line that demarcates rotating portion P3. Rotating portion P3 includes impeller 316 and rotor 336. Axis A3 runs through impeller 316 and is an axis of rotation. FIG. 3 also includes a compressive flow path, represented by arrows CF1-CF4, and a bypass flow path, represented by arrows BF1-BF3. Arrow CF1 is in inlet housing 342 between inlet 352 and first side 322 of impeller 316. Arrow CF2 is through impeller 316 along blades 330. Arrow CF3 is between backing plate 350 and a portion of duct housing 346. Arrow CF4 is in outlet housing 348. Arrow BF1 is through second journal bearing 362 between flange 334 and the second portion of motor housing 344. Arrow BF2 in air gap 340 moving toward axis A3. Arrow BF3 is through third journal bearing 364.

Motor 318 rotates impeller 316 to compress air in compressor 310. The air enters compressor 310 through inlet 352. The air moves along the compressive flow path following arrow CF1 through inlet housing 342 towards impeller 316. Motor 318 rotates rotor 336 adjacent to stator 338. Rotor 336 rotates impeller 316 around axis A3. Thrust bearing 358, first journal bearing 360, second journal bearing 362, and third journal bearing 364 support impeller 316 within compressor 310 so that impeller 316 can rotate with rotor 336. The air enters impeller 316 and follows arrow CF2 through blades 330. Rotation of impeller 316 and blades 330 increases the velocity of the air. The air exits impeller 316 at radially outer side 324 of impeller 316. As the air exits impeller 316, the air is either energized or de-energized. Energized air continues to flow along the compressive flow path. The energized air follows arrow CF3 from between backing plate 350 and duct housing 346 into a portion of duct 354 within duct housing 346. The velocity of the energized air decreases and the air pressure increases as the energized air moves through the portion of duct 354 within duct housing 346. Higher pressure air exits compressor 310 at outlet 356 following arrow CF4.

De-energized air from impeller 316 moves in a vortex as it exits impeller 316 and flows along bypass flow path. The de-energized air follows arrow BF1 between the second portion of motor housing 344 and flange 334. The de-energized air then moves through air gap 340 following arrow BF2. The de-energized air then moves between stator 338 and shroud 332 of impeller 316 into a portion of duct 354 near first side 322 of impeller 316. The de-energized air the mixes with air from inlet 352 and moves along compressive flow path following arrow CF1. Motor housing 344 and duct housing 346 are containment for impeller 316 and motor 318 so that compressor 310 meets safety standards for use in aircraft.

Compressor 310 has the same features as compressor 110 (shown in FIG. 1) and compressor 210 (shown in FIG. 2) that help reduce weight and increase efficiency when compared with a shaft-driven air compressor. These include impeller 316 having shroud 332, using thin blades for blades 330, decreasing the diameter of hub 326 near first side 322 of impeller 316, and employing other weight reduction methods when designing hub 326. Further, motor 318 has a compact design that requires less containment than a comparable, shaft-driven compressor. Motor 318 also create less torque than the comparable compressor because motor 318 is radially outward from impeller 316. Further, the bypass flow path is a casing bypass for cooling motor 318 and extending the operating range of compressor 310. Compressor 310 also has flange 334 which supports rotor 336 from centrifugal forces when motor 318 is running. Compressor 310 also has a compact and rigid arrangement. Compressor 310 requires few bearings and less containment due to this compact and rigid design.

Figure 4A:
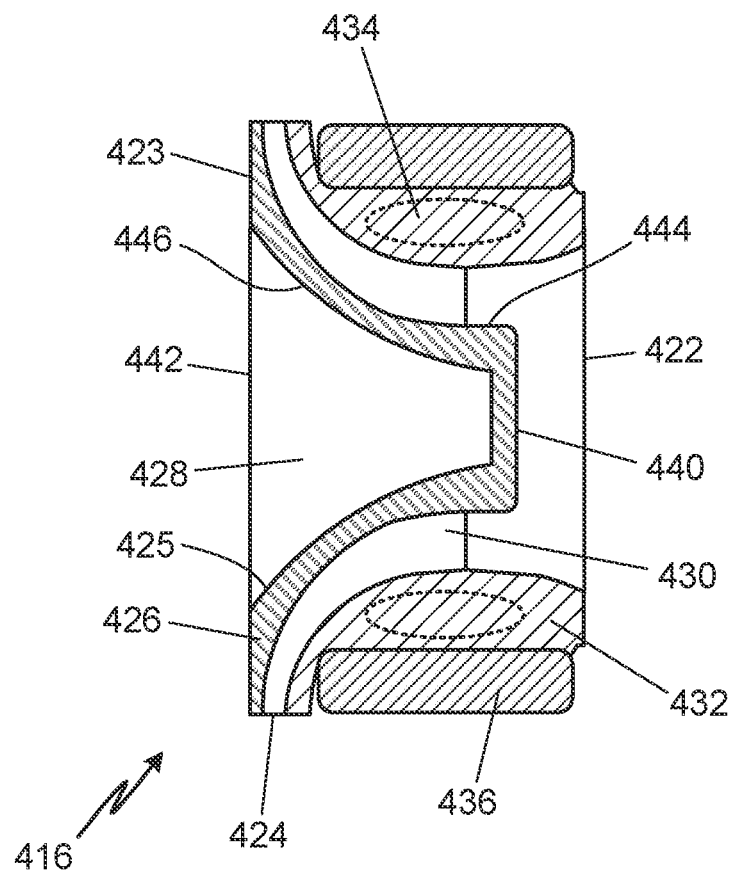
FIG. 4A is a cross-sectional view of a first embodiment of an impeller hub.
Figure 4B:
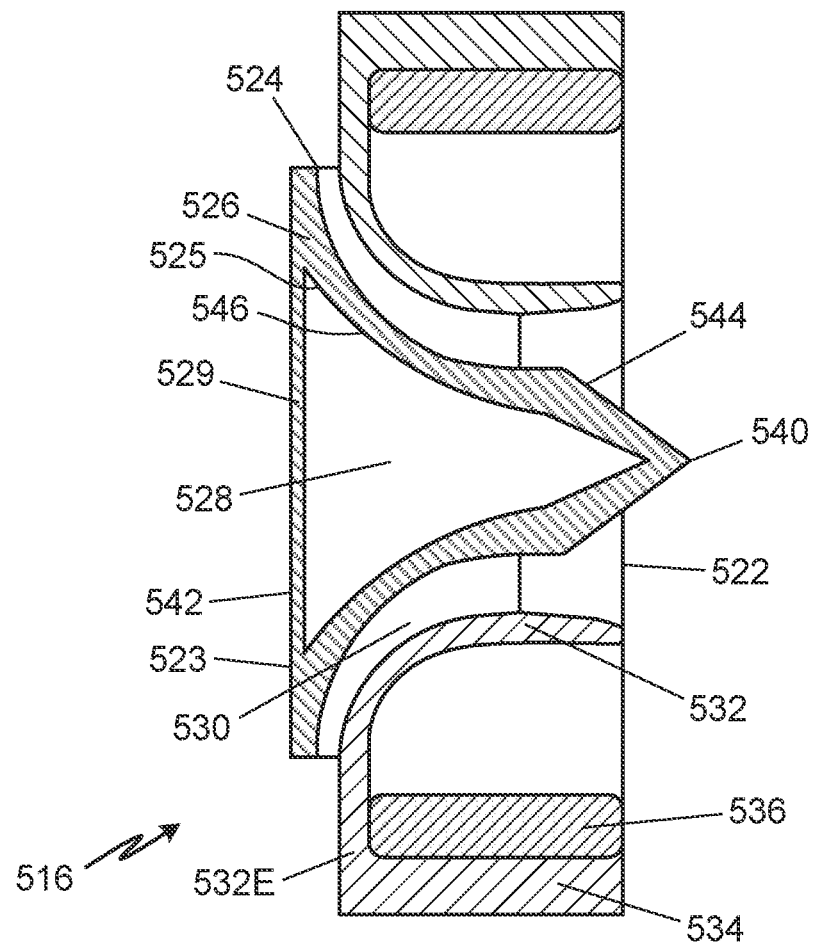
FIG. 4B is a cross-sectional view of a second embodiment of an impeller hub.
Figure 4C:
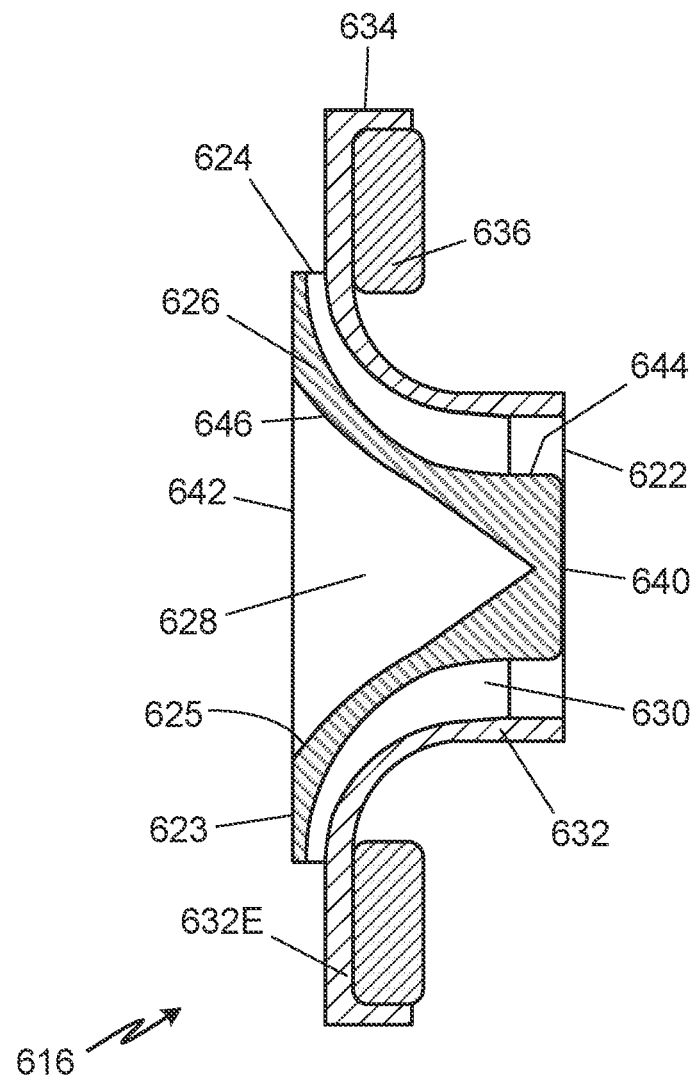
FIG. 4C is a cross-sectional view of a third embodiment of an impeller hub.

FIG. 4A is a cross-sectional view of impeller 416. FIG. 4B is a cross-sectional view of impeller 516. FIG. 4C is a cross-sectional view of impeller 616. FIGS. 4A-4C will be discussed together. FIG. 4A shows impeller 416 with first side 422, second side 423, radially outer side 424, radially inner side 425, hub 426, weight reduction area 428, blades 430, shroud 432, and weight reduction area 434. FIG. 4A also includes motor rotor 436. Hub 426 includes first side 440, second side 442, radially outer surface 444, and radially inner surface 446. FIG. 4B shows impeller 516 with first side 522, second side 523, radially outer side 524, radially inner side 525, hub 526, weight reduction area 528, support structure 529, blades 530, shroud 532, extended edge 532E, and flange 534. FIG. 4B also includes motor rotor 536. Hub 526 includes first side 540, second side 542, radially outer surface 544, and radially inner surface 546. FIG. 4C shows impeller 616 with first side 622, second side 623, radially outer side 624, radially inner side 625, hub 626, weight reduction area 628, blades 630, shroud 632, extended edge 632E, and flange 634 FIG. 4C also includes motor rotor 636. Hub 626 includes first side 640, second side 642, radially outer surface 644, and radially inner surface 646.

Impeller 416, impeller 516, and impeller 616 are different variations of impellers with various hub designs that can fit in shaftless rotary machines such as turbines, compressors (for example compressor 110 shown in FIG. 1, compressor 210 shown in FIG. 2, and compressor 310 shown in FIG. 3), and combined turbines and compressors. Those skilled in the art will recognize that different hub designs shown in impeller 416, impeller 516, and impeller 616 can be incorporated, separately or together, into designs for impeller 116 (shown in FIG. 1), impeller 216 (shown in FIG. 2), and impeller 316 (shown in FIG. 3).

Impeller 416 has a similar design as impeller 116 (shown in FIG. 1). In FIG. 4A, first side 422 of impeller 416 is on the right and second side 423 is on the left. First side 422 is an upstream portion of impeller 416. Radially outer side 424 of impeller 416 is positioned radially away from a central axis of impeller 416 and is a downstream portion of impeller 416. Radially inner side 425 is opposite radially outer side 424 of impeller 416. Hub 426 is hollow at weight reduction area 428. Weight reduction area 428 could also be porous, have cavities, have hollow spaces in a lattice pattern or another pattern, or have other common weight reduction designs. Weight reduction area 428 extends to second side 423 of impeller 416. Blades 430 connect to and extend radially outward from hub 426. Shroud 432 connects to blades 430 opposite hub 426. Shroud 432 includes weight reduction area 434. Weight reduction area 434 is a portion of shroud 432 that can have various configurations depending on structural and weight reduction needs. For instance, weight reduction area 434 can be hollow, porous, have cavities, or have hollow spaces in a lattice design or other designs. Shroud 432 fits motor rotor 436.

A radially inner surface of motor rotor 436 connects to shroud 432 of impeller 416. Motor rotor 436 can be a rotor for an electric motor like motor 118 (shown in FIG. 1). Motor rotor 436 and impeller 416 can be additively manufactured so that motor rotor 436 and impeller 416 are a monolithic component. Alternatively, motor rotor 436 can be additively manufactured onto shroud 432 so that motor rotor 436 and impeller 416 are an integral component.

Hub 426 includes first side 440, second side 442, radially outer surface 444, and radially inner surface 446. First side 440 of hub 426 is flat and is near first side 422 of impeller 416. Second side 442 of hub 426 is opposite first side 440. Second side 442 is open. Blades 430 connect to hub 426 at radially outer surface 444. Radially inner surface 446 of hub 426 is opposite radially outer surface 444. Radially outer surface 444 and radially inner surface 446 flare slightly away from a center of hub 426 toward second side 442 of hub 426. Weight reduction area 428 is shaped by radially inner surface 446 and has a generally frustoconical shape that flares radially outward towards second side 442 of hub 426. Second side 442 of hub 426 is open in impeller 416.

Impeller 516 has a similar design as impeller 216 (shown in FIG. 2). In FIG. 4B, first side 522 of impeller 516 is on the right and second side 523 is on the left. First side 522 is an upstream portion of impeller 516. Radially outer side 524 of impeller 516 is positioned radially away from a central axis of impeller 516 and is a downstream portion of impeller 516. Radially inner side 525 is opposite radially outer side 524. Hub 526 has weight reduction area 528 and support structure 529. Weight reduction area 528 is hollow. Weight reduction area 528 could also be porous, have cavities, have hollow spaces in a lattice pattern or another pattern, or have other common weight reduction designs. Support structure 529 is a thin disk located on second side 523 of impeller 516. Support structure 529 can have varying thicknesses to provide a variable amount of support to hub 526. Bearings necessary to hold impeller 516 in a rotary machine can be mounted adjacent to support structure 529. Blades 530 connect to and extend radially outward from hub 526. Shroud 532 connects to blades 530 opposite hub 526. Shroud 532 includes extended edge 532E and flange 534. Extended edge 532E is an extension of shroud 532. Extended edge 532E extends away from radially outer side 524 of impeller 516. Flange 534 protrudes from extended edge 532E towards first side 522 of impeller 516 and is radially outward from shroud 532. Flange 534 fits motor rotor 536.

A radially outer surface of motor rotor 536 connects to a radially inner surface of flange 534. Motor rotor 636 can be a rotor for an electric motor like motor 218 (shown in FIG. 2). Motor rotor 536 and impeller 516 can be additively manufactured so that motor rotor 536 and impeller 516 are a monolithic component. Alternatively, motor rotor 536 can be additively manufactured onto shroud 532 so that motor rotor 536 and impeller 516 are an integral component.

Hub 526 includes first side 540, second side 542, radially outer surface 544, and radially inner surface 546. First side 540 of hub 526 is near first side 522 of impeller 516. First side 540 of hub 526 is pointed. Second side 542 of hub 526 is opposite first side 540 near support structure 529. Blades 530 connect to hub 526 at radially outer surface 544. Radially inner surface 546 is opposite radially outer surface 544. Radially inner surface 546 of hub 526 is generally conical. Radially inner surface 546 flares radially outward towards second side 542. Radially inner surface 546 and support structure 529 define weight reduction area 528. Weight reduction area 528 has a generally conical shape which flares slightly towards radially outer side 524 of impeller 516 near support structure 529.

Impeller 616 has a similar design as impeller 316 shown in FIG. 3. In FIG. 4C, first side 622 of impeller 616 is on the right and second side 623 is on the left. First side 622 is an upstream portion of impeller 616. Radially outer side 624 of impeller 616 is positioned radially away from a central axis of impeller 416 and is a downstream portion of impeller 616. Radially inner side 625 is opposite radially outer side 624. Hub 626 is hollow at weight reduction area 628. Weight reduction area 628 could also be porous, have cavities, have hollow spaces in a lattice pattern or another pattern, or have other common weight reduction designs. Blades 630 connect to and extend radially outward from hub 626. Shroud 632 connects to blades 630 opposite hub 626. Shroud 632 includes extended edge 632E and flange 634. Extended edge 632E is an extension of shroud 632 that extends away from radially outer side 624 of impeller 616. Flange 634 protrudes from extended edge 632E towards first side 622 of impeller 616 and is radially outward from shroud 632. Extended edge 632E and flange 634 fit motor rotor 636.

A first side of motor rotor 636 is near first side 622 of impeller 616. A second side of motor rotor 636 is opposite the first side. The second side of motor rotor 636 connects to extended edge 632E of shroud 632. A radially outer side of motor rotor 636 connects to a radially inner side of flange 634. Motor rotor 636 and impeller 616 can be additively manufactured so that motor rotor 636 and impeller 616 are a monolithic component. Alternatively, motor rotor 636 can be additively manufactured onto shroud 632 so that motor rotor 636 and impeller 616 are an integral component.

Hub 626 includes first side 640, second side 642, radially outer surface 644, and radially inner surface 646. First side 640 of hub 626 is flat and is near first side 622 of impeller 616. Second side 642 of hub 626 is opposite first side 640. In hub 626, second side 642 is open. Blades 630 connect to radially outer surface 644. Radially outer surface 644 has a generally frustoconical shape that flares towards radially outer side 624. Radially inner surface 646 is opposite radially outer surface 644. Radially inner surface 646 has a conical shape, radially inner surface 646 defines weight reduction area 628. Weight reduction area 628 is conical. Weight reduction area 628 extends to second side 642 of hub 626. Second side 642 of hub 626 is open in impeller 616.

Impeller 416, impeller 516, and impeller 616 are impellers for a shaftless rotary machine. Impeller 416, impeller 516, and impeller 616 rotate within the rotary machine. Impeller 416, impeller 516, and impeller 616 increase the velocity of air that moves through each impeller. Weight reduction area 428, weight reduction area 528, and weight reduction area 628 are lightweight areas in hub 426, hub 526, and hub 626, respectively. Weight reduction area 428, weight reduction area 528, and weight reduction area 628 allow for flexibility in designing impellers for a shaftless rotary machine. Support structure 529 is a structural support element to increase stability of hub 516. Support structure 529 can be in any hub design for the shaftless rotary machine, such as hub 426 and hub 626. Bearings, like air bearings or magnetic bearings, can be positioned in weight reduction area 428 and weight reduction area 628 to support impeller 416 and impeller 616, respectively, within a rotary machine.

Impeller 416, impeller 516, and impeller 616 show hub designs that can be used for a shaftless rotary machine such as compressor 110 (shown in FIG. 1), compressor 210 (shown in FIG. 2), and compressor 310 (shown in FIG. 3). Weight reduction area 428, weight reduction area 528, and weight reduction area 628 could be used instead of weight reduction area 128 (shown in FIG. 1), weight reduction area 228 (shown in FIG. 2), or weight reduction area 328 (shown in FIG. 3) to reduce the weight of impeller 116 (shown in FIG. 1), impeller 216 (shown in FIG. 2) or impeller 316 (shown in FIG. 3). Weight reduction area 428, weight reduction area 528, and weight reduction area 628 can be specifically designed for the different needs of a shaftless rotary machine. A shaftless rotary machine could utilize any of the designs of weight reduction area 428, weight reduction area 528, weight reduction area 628, or combinations thereof to optimize the strength of an impeller in the shaftless rotary machine Weight reduction area 428, weight reduction area 434, weight reduction area 528, and weight reduction area 628 allow for flexible designs such as being porous or having hollow cavities that allow for customization of the impeller in a shaftless rotary machine. Weight reduction area 428, weight reduction area 434, weight reduction area 528, and weight reduction area 628 allow for the impeller in the shaftless rotary machine to be lighter than a traditional impeller. A lighter impeller requires less containment, meaning rotary machines employing impellers with weight reduction area 428, weight reduction area 434, weight reduction area 528 or weight reduction area 628 are lighter.

Figure 5:
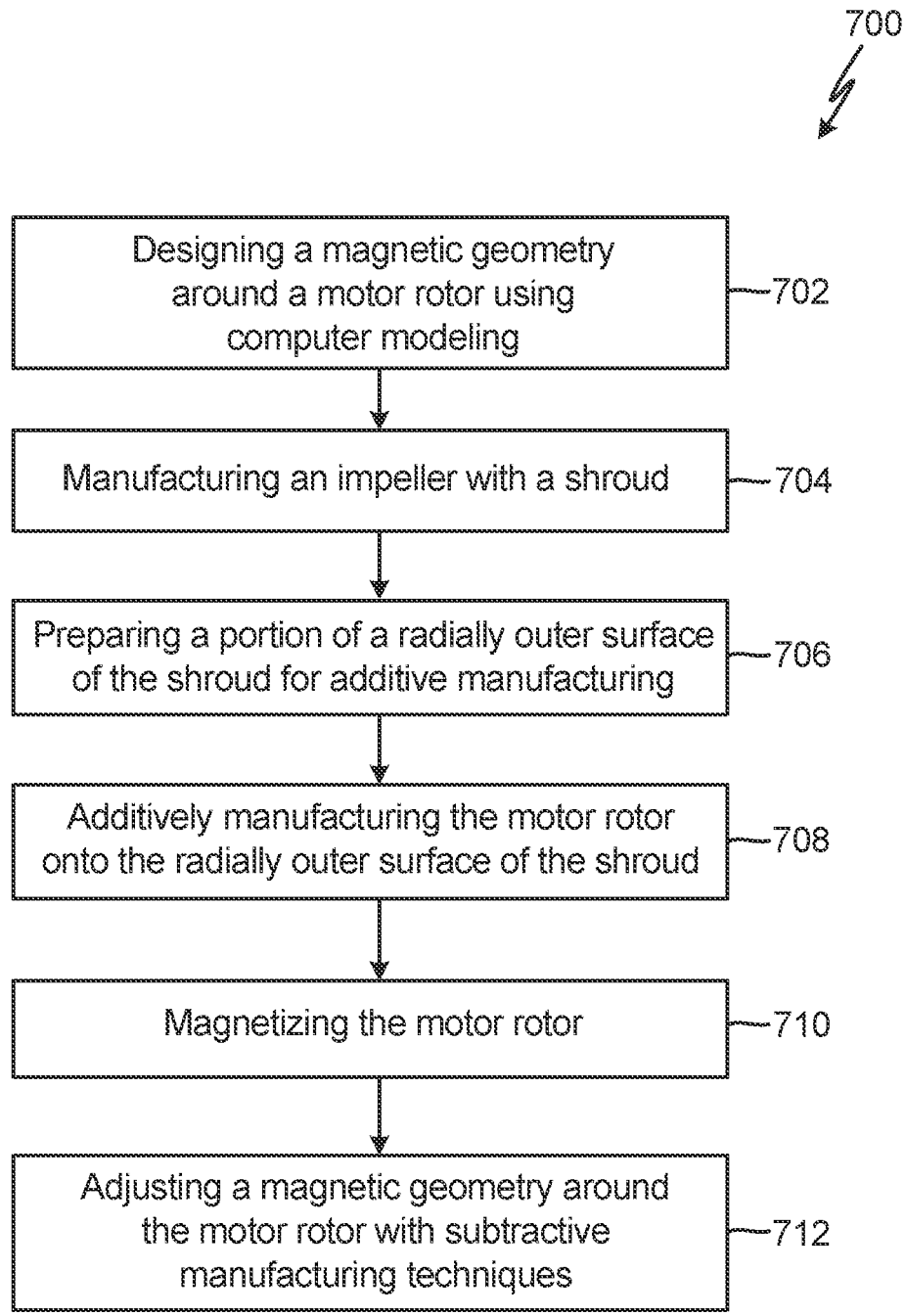
FIG. 5 is a flowchart showing steps for manufacturing an integral impeller and motor rotor.

FIG. 5 is a flowchart showing steps of process 700 for manufacturing an integral impeller and motor rotor. Process 700 includes steps 702-712. Step 702 includes designing a magnetic geometry around a motor rotor using computer modeling. Step 704 includes manufacturing an impeller with a shroud. Step 706 includes preparing a portion of a radially outer surface of the shroud for additive manufacturing. Step 708 includes additively manufacturing a motor rotor onto the radially outer surface of the shroud. Step 710 includes magnetizing the motor rotor. Step 712 includes adjusting the magnetic geometry around the motor rotor with subtractive manufacturing techniques.

Step 702 includes designing a magnetic geometry around a motor rotor using computer modeling. Magnetic geometry is the shape of a magnetic field around a component. Motor rotors, stators, and cores (combined rotors and stators) each have a magnetic geometry, the shape and magnetic strength of the component affects magnetic geometries. Computer modeling can determine how changes in the shape and magnetic strength of a component will change the magnetic geometry of the component. Computer modeling can design a magnetic geometry around a motor rotor, such as rotor 136 (shown in FIG. 1), rotor 236 (shown in FIG. 2), rotor 336 (shown in FIG. 3), motor rotor 436 (shown in FIG. 4A), motor rotor 536 (shown in FIG. 4B) and motor rotor 636 (shown in FIG. 4C). Step 702 allows for optimizing the magnetic geometry to keep the magnetic field closely around the motor rotor. This increases the efficiency of a rotary machine utilizing the motor rotor. Step 702 increases the efficiency of process 700 because computer modeling the magnetic geometry of the motor rotor decreases the number of adjustments necessary after manufacturing the motor rotor. Step 702 is an optional step in process 700.

Step 704 includes manufacturing an impeller with a shroud. Step 704 can create impeller 116 (shown in FIG. 1), impeller 216 (shown in FIG. 2), impeller 316 (shown in FIG. 3), impeller 416 (shown in FIG. 4A), impeller 516 (shown in FIG. 4B), and impeller 616 (shown in FIG. 4C). Step 704 can employ both additive, subtractive, and other manufacturing methods. Subtractive manufacturing methods include, for example, milling and machining. Other manufacturing methods include casting, molding, stamping, forging, and other suitable methods for creating metal components. Step 704 can additionally or alternatively employ additive manufacturing techniques such as selective laser melting, selective laser sintering, selective electron beam melting, direct metal laser sintering, fused deposition modeling, combinations of these techniques, and other appropriate additive manufacturing techniques. The impeller can be made from iron, steel, aluminum, carbon steel, cobalt, and other metals. Manufacturing an impeller with a shroud can include manufacturing a hub with a hollow portion in the hub. The hollow portion can be a weight reduction area, such as weight reduction area 128 (shown in FIG. 1), weight reduction area 228 (shown in FIG. 2), weight reduction area 328 (shown in FIG. 3), weight reduction area 428 (shown in FIG. 4A), weight reduction area 528 (shown in FIG. 4B), or weight reduction area 628 (shown in FIG. 4C). Manufacturing the impeller also includes manufacturing blades and a shroud. The blades connect to the hub. The blades can be integrally manufactured by additively manufacturing the blades onto the hub, monolithically manufactured by additively manufacturing the hub and the blades or manufactured using any other appropriate processes. The shroud connects to the blades opposite the hub. Like the blades, the shroud can be integrally manufactured by additively manufacturing the shroud onto the blades, monolithically manufactured by additively manufacturing the hub, the blades, and the shroud, or manufactured using any other appropriate processes.

Step 706 includes preparing a portion of a radially outer surface of the shroud for additive manufacturing. Preparing a portion of a radially outer surface of the shroud includes modifying the portion of the radially outer surface of the shroud so that additively manufactured components are integrated into the impeller shroud. Preparing or modifying the impeller for additive manufacturing can include using milling and machining techniques and heating portions of the shroud. When additive manufacturing processes are used in step 704 to create the impeller, step 706 is optional because the radially outer surface of the shroud is prepared for additive manufacturing during step 704. Preparing the surface allows for better integration of the motor rotor into the impeller shroud.

Step 708 includes additively manufacturing a motor rotor onto the radially outer surface of the shroud. The motor rotor can be of any general type including a squirrel-cage rotor, a wound rotor, a salient pole rotor, or another type of rotor. Step 708 creates an integral impeller and motor rotor. An integral component has a first sub-component additively manufactured onto a second sub-component that was made using a separate manufacturing process from the additive manufacturing process creating the first sub-component. During step 708, the motor rotor is additively manufactured onto the portion of the radially outer surface of the shroud that was prepared in step 706. Additive manufacturing techniques can include, for example, selective laser melting, selective laser sintering, selective electron beam melting, direct metal laser sintering, fused deposition modeling, combinations of these techniques, and other additive manufacturing techniques appropriate for building a motor rotor. The motor rotor is made of metals including iron, steel, aluminum, nickel, carbon steel, neodymium (NdFeB), cobalt, combinations of these metals, and any other appropriate metals. The motor rotor may also be made of permanently magnetic materials. During step 708, motor rotor coils and windings can also be additively manufactured in and around the motor rotor, if necessary. Additively manufacturing the motor rotor onto the impeller shroud creates a strong connection between the motor rotor and the impeller. This connection needs to be strong to withstand the centrifugal force pushing the motor rotor away from the impeller when in use in a rotary machine.

Step 710 includes magnetizing the motor rotor. The specific method to magnetize the motor rotor depends on the metal used to create the motor rotor and the type of motor rotor created. If a permanently magnetic material is used in step 708, then step 710 is unnecessary because the motor rotor will be magnetized. If the motor rotor is additively manufactured using another material, magnetizing the motor rotor can be done any suitable way to create a permanent magnet. One way is by connecting the motor rotor to an electrical circuit and running a high current through the motor rotor. Permanently magnetizing the motor rotor reduces the need for electrical connections to the motor rotor and allows for the impeller to rotate freely in the shaftless rotary machine. Alternatively or additionally, windings, plates, or combinations thereof may be used to magnetize the motor rotor. Motor rotors with windings require copper wires to be added to the motor rotor manufactured in step 708. The copper wires can be additively manufactured into the motor rotor or be added with other known processes. Magnetizing the motor rotor allows the electric motor to operate once the impeller and motor rotor is installed in the rotary machine.

Step 712 includes adjusting the magnetic geometry around the motor rotor with subtractive manufacturing techniques. Step 712 is optional. However, if the magnetic geometry needs adjusting, subtractive manufacturing methods such as milling can be used to change the shape of the motor rotor and consequently change the magnetic geometry around the motor rotor. Step 712 allows for a design that keeps the magnetic field produced by the motor rotor inside a motor that utilizes the motor rotor.

Process 700 allows for an impeller and a motor rotor to be integrally constructed. Process 700 creates a high strength connection between the impeller and the motor rotor. A strong connection between the impeller and the motor rotor is important when using the impeller in a rotary machine, such as compressor 110 (shown in FIG. 1), compressor 210 (shown in FIG. 2), or compressor 310 (shown in FIG. 3), because impellers in rotary machines rotate at high speeds (over 100,000 rpm). High speed rotation creates strong centrifugal force. A strong connection between the motor rotor and the impeller keeps the motor rotor from detaching.

Additive manufacturing processes and computer modeling in method 700 allow for designs that keep the magnetic geometry near the motor rotor. Keeping the magnetic geometry near the motor rotor increases the magnetic field within an electric motor using the motor rotor. This makes the electric motor more efficient. Computer modeling also make process 700 more efficient by decreasing the number of adjustments necessary at the end to have the magnetic geometry stay within the electric motor.

Combined impellers and motor rotors made with method 700 can also be lighter and smaller because of weight reduction methods used in creating the hub and the compact design of having the motor rotor directly on the impeller shroud. This reduces the overall weight of the rotary machine because of the reduced weight of the component and the reduced amount of containment necessary for the rotary machine. Further, method 700 reduces the manufacturing costs of creating the impeller and the motor rotor because the most economic processes can be used to create the impeller and the motor rotor. Manufacturing the rotary machine is also less costly because a combined impeller and motor rotor requires less assembly and alignment.

Figure 6:
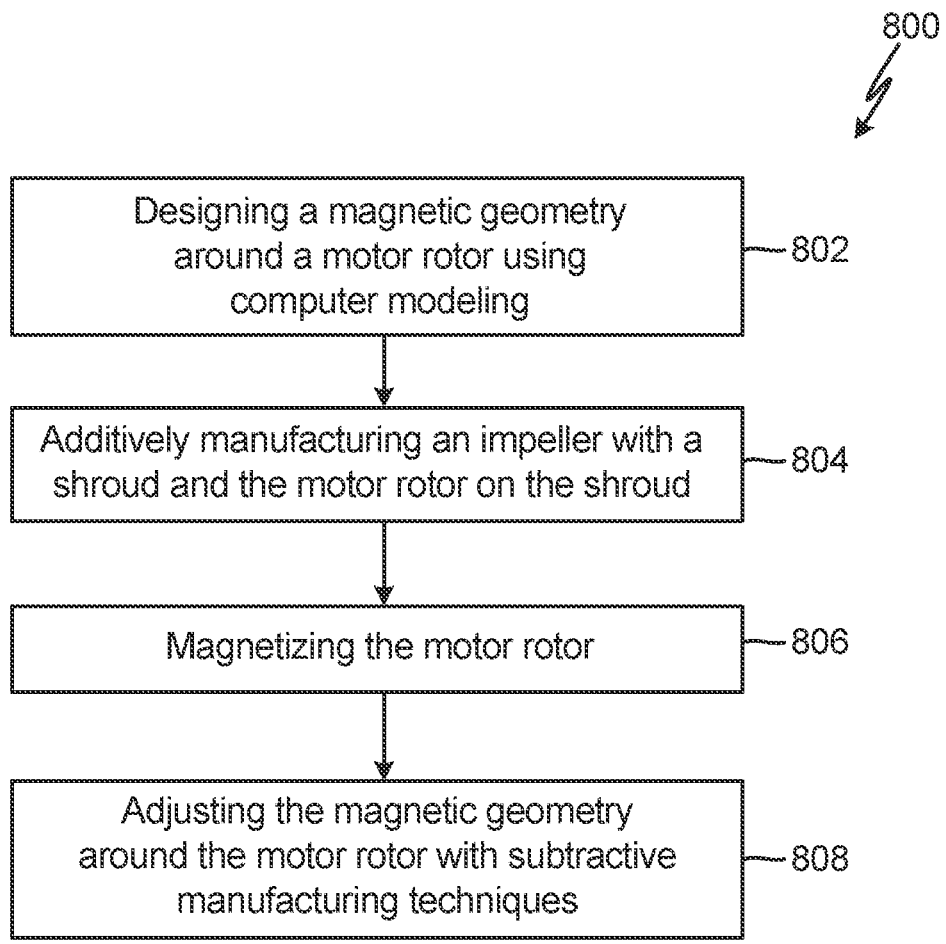
FIG. 6 is a flowchart showing steps for additively manufacturing a monolithic impeller and motor rotor

FIG. 6 is a flowchart showing process 800 for additively manufacturing a monolithic impeller and motor rotor. Process 600 includes steps 802-808. Step 802 includes designing a magnetic geometry around a motor rotor using computer modeling. Step 804 includes additively manufacturing an impeller with a shroud and the motor rotor on the shroud. Step 806 includes magnetizing the motor rotor. Step 808 includes adjusting the magnetic geometry around the motor rotor with subtractive manufacturing techniques.

Step 802 includes designing a magnetic geometry around a motor rotor using computer modeling. As discussed in relation to step 702 of process 700, magnetic geometry is the shape of a magnetic field around a component. Computer modeling can be used to design the magnetic geometry of a component. Computer modeling can design a magnetic geometry around a motor rotor, such as rotor 136 (shown in FIG. 1), rotor 236 (shown in FIG. 2), rotor 336 (shown in FIG. 3), motor rotor 436 (shown in FIG. 4A), motor rotor 536 (shown in FIG. 4B), and motor rotor 636 (shown in FIG. 4C). Step 802 allows for a design that keeps the magnetic field closely around the motor rotor. This designing optimizes the magnetic geometry of the motor rotor and the efficiency of a motor utilizing the motor rotor. Step 802, like step 702, increases the efficiency of process 800 by reducing the number of adjustments necessary after manufacturing the motor rotor. Step 802 is however an optional step.

Step 804 includes additively manufacturing an impeller with a shroud and the motor rotor on the shroud. Step 804 creates a shrouded impeller and motor rotor like impeller 116 (shown in FIG. 1), impeller 216 (shown in FIG. 2), impeller 316 (shown in FIG. 3), impeller 416 (shown in FIG. 4A), impeller 516 (shown in FIG. 4B), and impeller 616 (shown in FIG. 4C). Step 804 creates a monolithic impeller and motor rotor. A monolithic component additively manufactured, especially where the component has sub-components that could be separately manufactured and later joined. Additive manufacturing techniques can include, for example, selective laser melting, selective laser sintering, selective electron beam melting, direct metal laser sintering, fused deposition modeling, combinations of these techniques, and other additive manufacturing techniques appropriate for building a motor rotor. The motor rotor is made of metals including iron, steel, aluminum, nickel, carbon steel, neodymium (NdFeB), cobalt, combinations of these metals, and any other appropriate metals. Appropriate metals are those that can be magnetized. Permanently magnetic materials may also be used. In step 804, the resultant impeller and the motor rotor are one monolithic component. The motor rotor may be any type of rotor, like a squirrel-cage rotor, a wound rotor, a salient pole rotor, or another type of rotor. Using additive manufacturing to create the shrouded impeller and motor rotor increases the strength of the bond between the impeller and the motor rotor. Strong centrifugal forces are exerted on the motor rotor when the impeller and motor rotor are installed in a rotary machine. Additively manufacturing the impeller and motor rotor decreases the likelihood of the motor rotor detaching from the impeller.

Step 806 includes magnetizing the motor rotor. Step 806 is like step 701. The specific method to magnetize the motor rotor depends on the metal used to create the motor rotor and the type of motor rotor created. If a permanently magnetic material is used in step 804, then step 806 is unnecessary because the motor rotor will be magnetized. If the motor rotor is additively manufactured using another material, magnetizing the motor rotor can be done any suitable way to create a permanent magnet. One way is by connecting the motor rotor to an electrical circuit and running a high current through the motor rotor. Permanently magnetizing the motor rotor reduces the need for electrical connections to the motor rotor and allows for the impeller to rotate freely in the shaftless rotary machine. Alternatively or additionally, windings, plates, or combinations thereof may be used to magnetize the motor rotor. Motor rotors with windings require copper wires to be added to the motor rotor manufactured in step 708. The copper wires can be additively manufactured into the motor rotor or be added with other known processes. Magnetizing the motor rotor allows the electric motor to operate once the impeller and motor rotor is installed in the rotary machine.

Step 808 includes adjusting the magnetic geometry around the motor rotor with subtractive manufacturing techniques. Like step 712, step 808 is optional. However, if the magnetic geometry needs adjusting, subtractive manufacturing methods such as milling can be used on the motor rotor. This subtractive manufacturing changes the shape of the motor rotor the magnetic geometry around the motor rotor. Step 808 allows for more of the magnetic field produced by the motor rotor to contact a stator when the impeller is in a rotary machine.

Additively manufacturing the monolithic impeller and motor rotor reduces the likelihood that centrifugal forces will detach the motor rotor from the impeller in the rotary machine. The monolithic impeller and motor rotor has a compact design with a reduced weight compared to separate impellers and motors connected by a shaft. The compact design also reduces the necessary containment in rotary machines utilizing the monolithic impeller and motor rotor, reducing the weight of the machine. Further, manufacturing costs are decreased because the monolithic impeller and motor rotor reduces the number of alignments necessary to assemble the rotary machine and assembly time.

Figure 7:
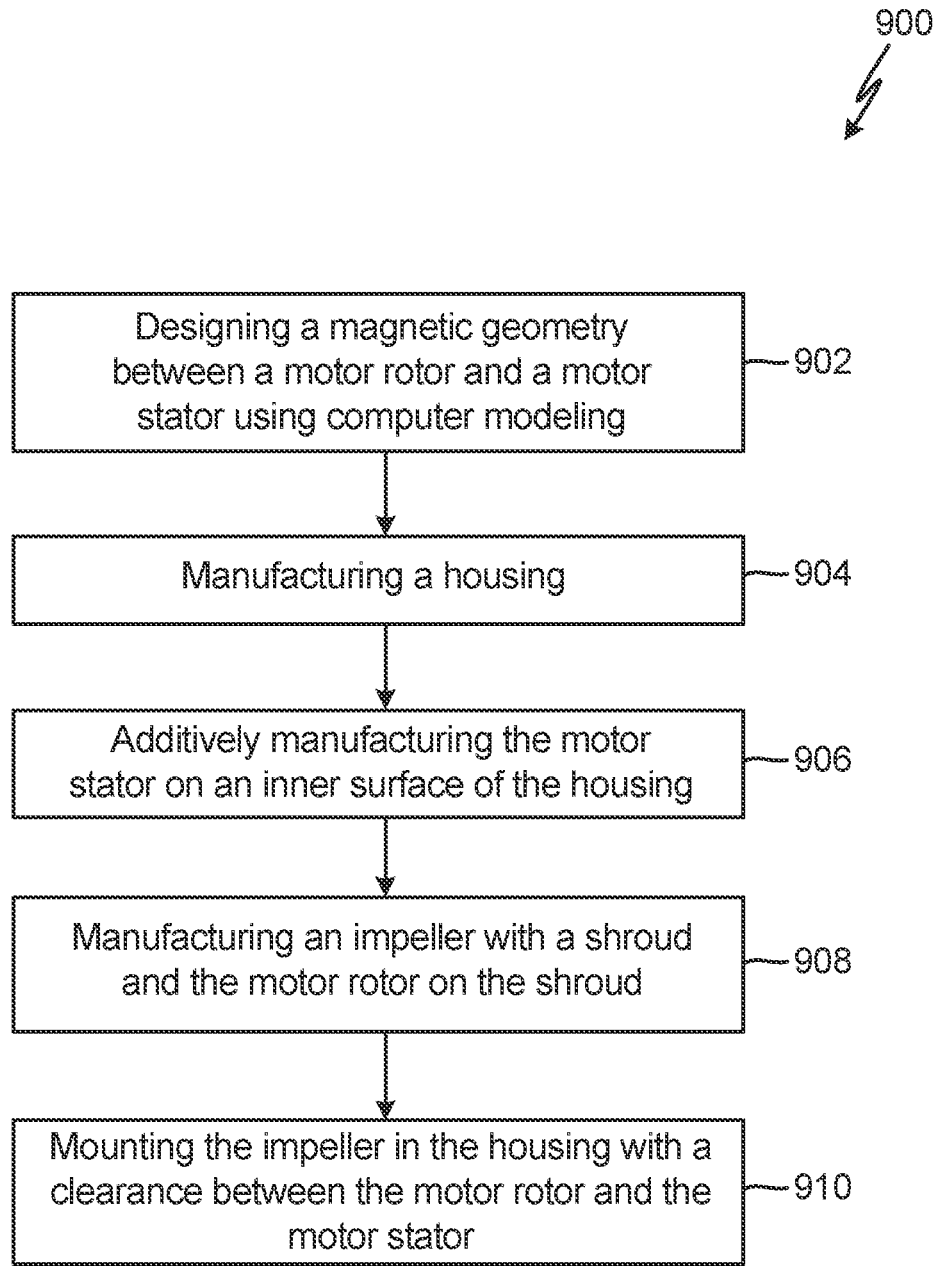
FIG. 7 is a flowchart showing steps for manufacturing a shaftless rotary machine.

FIG. 7 is a flowchart showing steps of process 900 for manufacturing a shaftless rotary machine. Process 900 can be used to create compressor 110 (shown in FIG. 1), compressor 210 (shown in FIG. 2), compressor 310 (shown in FIG. 3), or any turbine or combined turbine and compressor with configurations like compressor 110 (shown in FIG. 1), compressor 210 (shown in FIG. 2), compressor 310 (shown in FIG. 3). FIG. 6 includes steps 902-912. Step 902 includes designing a magnetic geometry between a motor rotor and a motor stator using computer modeling. Step 904 includes manufacturing a housing. Step 906 includes additively manufacturing the motor stator on an inner surface of the housing. Step 908 includes manufacturing an impeller with a shroud. Step 910 includes mounting the impeller in the housing with a clearance between the motor rotor and the motor stator.

Step 902 includes optimizing the magnetic geometry between a motor rotor and a motor stator using computer modeling. As discussed in relation to step 702 and step 802, magnetic geometry is the shape of a magnetic field around components of an electric motor. Computer modeling can design the shape of the motor rotor and the motor stator and the resulting a magnetic field generated by each. Computer modeling can also help design how the magnetic geometries of the motor rotor and the motor stator will interact when assembled into a motor. Computer modeling allows for design changes to surfaces of the motor rotor and the motor stator that will interact with each other before building the components. Computer modeling can help optimize the design of the components and their respective magnetic geometries, making the motor more efficient. An optimized magnetic geometry design keeps the magnetic field within the motor and increases the interaction between a magnetic field of the motor rotor and a magnetic field of the motor stator. Optimizing the magnetic geometry before building the components increases the efficiency of the building process.

Step 904 includes manufacturing a housing. Step 904 produces a housing such as housing 120 (shown in FIG. 1), housing 220 (shown in FIG. 2), or housing 320 (shown in FIG. 3). The housing is made of light-weights metals that can withstand elevated temperatures typical during rotary machine operation. Such metals can include, for example, aluminum and carbon steel. The housing can be constructed using either additive manufacturing techniques or non-additive manufacturing techniques. Additive manufacturing techniques can include, for example, selective laser melting, selective laser sintering, selective electron beam melting, direct metal laser sintering, fused deposition modeling. Non-additive manufacturing techniques can include, for example, molding, machining, casting, or milling.

Step 906 includes additively manufacturing the motor stator on an inner surface of the housing. Step 906 can make stator 138 (shown in FIG. 1), stator 238 (shown in FIG. 2), or stator 338 (shown in FIG. 3). The position on the inner surface of the housing depends on the position of the motor stator in the finished rotary machine. For example, stator 138 (shown in FIG. 1) should be additively manufactured on a radially inner surface of duct housing 146; stator 238 (shown in FIG. 2) should be additively manufactured onto a radially outer portion of inlet housing 242; and stator 338 (shown in FIG. 3) should be additively manufactured on an inner surface of motor housing 344. When forming the housing using additive manufacturing techniques, the motor stator can be additively manufactured with the housing to create a monolithic housing and motor stator. When forming the housing with non-additive manufacturing techniques, the motor stator can be additively manufactured onto the housing creating an integrated housing and motor stator. The surface of the housing that the motor stator will be additively manufactured onto will need to be prepared. This preparation is like the preparation done in step 708. Machining and melting a surface for the additive manufacturing to take place onto the appropriate portion of the housing for motor stator placement is one way to prepare the housing. While additively manufacturing the motor stator, any necessary coils, windings and cooling channels can be additively manufactured. Step 906 allows for the housing and the motor stator to be one monolithic component or one integral component. Having monolithic and integral components decreases cost and assembly time when building rotary machines.

Step 908 includes manufacturing an impeller with a shroud and the motor rotor on the shroud. Step 908 can follow process 700 to manufacture an integral impeller and motor rotor. Alternatively, step 908 can follow process 800 to additively manufacture a monolithic impeller and motor rotor. As discussed in relation to process 700 and process 800, the motor rotor can bey any type of motor rotor, such as a squirrel cage rotor, a wound rotor, a salient pole rotor, or another appropriate type of rotor. Manufacturing the impeller and motor rotor as one component decreases the weight of the rotary machine by reducing the amount of containment necessary. Further, combining the impeller and motor rotor reduces the amount of necessary assembly and the cost of the machine.

Step 910 includes mounting the impeller in the housing with a clearance between the motor rotor and the motor stator. A clearance between a motor rotor and a motor stator is a distance between the motor rotor and the motor stator necessary to have the motor operate efficiently. The proper clearance for any motor depends on the type of motor and the configuration of the motor rotor and the motor stator. The impeller can be like impeller 116 (shown in FIG. 1), impeller 216 (shown in FIG. 2), impeller 316 (shown in FIG. 3), impeller 416 (shown in FIG. 4A), impeller 516 (shown in FIG. 4B), or impeller 616 (shown in FIG. 4C). The orientation of the motor rotor and the motor stator of the rotary machine depends on the configuration of the final machine. Rotary machine 110 (shown in FIG. 1) has impeller 116 (or a similar impeller) mounted into housing 120 with a radially inner surface of stator 138 toward a radially outer surface of rotor 136. Rotary machine 210 (shown in FIG. 2) has impeller 216 (or a similar impeller) mounted into housing 220 with a radially inner surface of rotor 236 toward a radially outer surface of stator 238. Rotary machine 310 (shown in FIG. 3) has impeller 316 (or a similar impeller) mounted into housing 320 with a rear surface of stator 338 toward a front surface of rotor 136. With each configuration, mounting the impeller in the housing requires maintaining a proper clearance between the motor rotor and the motor stator. A proper clearance is determined based on the configuration of the motor. Mounting the impeller into the housing also requires placing bearings between rotating surfaces and non-rotating surfaces of the rotary machine. Bearing placement can change depending on the configuration of the rotary machine and the design of the impeller, especially weight reduction portions.

Process 900 has the benefits of either process 700 or process 800 depending on how the impeller and motor rotor is built. The main benefit of processes 700 and 800 is that integral and monolithic impellers and motor rotors have high strength internal connections. This decreases the likelihood that the motor rotor will detach from the impeller due to centrifugal forces when the rotary machine is operating. Process 900 also includes designing magnetic geometries of the magnetic fields surrounding the motor rotor and the motor stator to optimize electro-magnetic performance of the motor in the rotary machine. Optimizing the magnetic geometries increases the electro-magnetic interaction between the motor rotor and the motor stator and increases motor performance. Computer modeling the magnetic geometries allows for more complex geometries and leads to better magnetic field interaction and motor performance. Process 900 leads to overall weight and size reduction because the impeller and the motor rotor are one piece. Process 900 also reduces manufacturing costs. Combined components, such as the impeller and motor rotor and the housing and motor stator, decrease assembly time and reduce the number of necessary alignments.

Discussion of Possible Embodiments

The following are non-exclusive descriptions of possible embodiments of the present invention.

A method of manufacturing an integral impeller and motor rotor. The method includes manufacturing an impeller with a shroud, modifying a radially outer surface of the shroud to prepare the outer surface for additive manufacturing, additively manufacturing a motor rotor onto the radially outer surface of the shroud such that the motor rotor has a magnetic field with a geometry designed by computer modeling, and magnetizing the rotor.

The method of the preceding paragraph can optionally include, additionally and/or alternatively, any one or more of the following features, configurations and/or additional components:

A further embodiment of the foregoing method, wherein the motor rotor is manufactured using an additive manufacturing process selected from the group consisting of selective laser melting, selective laser sintering, selective electron beam melting, direct metal laser sintering, fused deposition modeling, and combinations thereof.

A further embodiment of any of the foregoing methods, wherein the motor rotor is made of a permanently magnetic metal.

A further embodiment of any of the foregoing methods and further including adjusting the geometry the magnetic field around the motor rotor by using subtractive manufacturing techniques on the motor rotor.

A further embodiment of any of the foregoing methods, wherein additively manufacturing the motor rotor includes additively manufacturing coils and windings within the motor rotor.

A further embodiment of any of the foregoing methods, wherein the motor rotor is made of a metal selected from the group consisting of iron, steel, aluminum, nickel, carbon steel, neodymium (NdFeB), cobalt, and combinations thereof.

A method of manufacturing a monolithic impeller and motor rotor. The method includes additively manufacturing an impeller with a shroud and a motor rotor on a radially outer surface of the shroud and magnetizing the motor rotor. The motor rotor has a magnetic field with a geometry designed using computer modeling.

The method of the preceding paragraph can optionally include, additionally and/or alternatively, any one or more of the following features, configurations and/or additional components:

A further embodiment of the foregoing method, and further including adjusting the geometry of the magnetic field around the motor rotor by using subtractive manufacturing techniques on the motor rotor.

A further embodiment of any of the foregoing methods, wherein the impeller, the shroud, and the motor rotor are additively manufactured using a process selected from the group consisting of selective laser melting, selective laser sintering, selective electron beam melting, direct metal laser sintering, fused deposition modeling, and combinations thereof.

A further embodiment of any of the foregoing methods, wherein the impeller and the motor rotor are made of a metal selected from the group consisting of iron, steel, aluminum, nickel, carbon steel, neodymium (NdFeB), cobalt, and combinations thereof.

A method of manufacturing a shaftless rotary machine, the method including manufacturing a housing with an inlet, an outlet, and a duct extending from the inlet to the outlet; additively manufacturing a motor stator on an inner surface of the housing; manufacturing an impeller with a shroud and the motor rotor on the shroud; and mounting the impeller in the housing with a clearance between the rotor adjacent to the stator.

The method of the preceding paragraph can optionally include, additionally and/or alternatively, any one or more of the following features, configurations and/or additional components:

A further embodiment of the foregoing method, wherein housing and the motor stator are manufactured using additive manufacturing to form a monolithic housing and motor stator.

A further embodiment of any of the foregoing methods, and further including designing a geometry of a magnetic field around the motor rotor using computer modeling and modifying a portion of a radially outer surface of the shroud to prepare the radially outer surface for additive manufacturing, wherein manufacturing an impeller with a shroud and the motor rotor on the shroud includes additively manufacturing the motor rotor onto a radially outer surface of the shroud.

A further embodiment of any of the foregoing methods, and further including designing a geometry of a magnetic field around the motor rotor using computer modeling, wherein manufacturing an impeller with a shroud and the motor rotor on the shroud includes additively manufacturing the impeller with the motor rotor on the shroud.

A further embodiment of any of the foregoing methods, and further including magnetizing the motor rotor and adjusting the geometry of the magnetic field around the motor rotor by using subtractive manufacturing techniques on the motor rotor.

A further embodiment of any of the foregoing methods, wherein the housing and the motor stator, and the impeller, the shroud, and the motor rotor are additively manufactured using a process selected from the group consisting of selective laser melting, selective laser sintering, selective electron beam melting, direct metal laser sintering, fused deposition modeling, and combinations thereof.

A further embodiment of any of the foregoing methods, wherein the impeller and the motor rotor are made of a metal selected from the group consisting of iron, steel, aluminum, nickel, carbon steel, neodymium (NdFeB), cobalt, and combinations thereof.

A further embodiment of any of the foregoing methods, wherein mounting the impeller into the housing with the clearance between the motor rotor adjacent to the motor stator includes orienting a radially inner surface of the motor stator toward a radially outer surface of the motor rotor, orienting a radially inner surface of the motor rotor toward a radially outer surface of the motor stator or orienting a second side of the motor stator toward a first side of the motor rotor.

A further embodiment of any of the foregoing methods, and further including designing a geometry of a magnetic field between the motor rotor and the motor stator before construction using computer modeling.

A further embodiment of any of the foregoing methods, and further including additively manufacturing coils and windings within the motor stator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manufacturing an integral impeller and motor rotor, the method comprising:

manufacturing an impeller with a shroud;
modifying a radially outer surface of the shroud to prepare the radially outer surface for additive manufacturing;
additively manufacturing a motor rotor onto the radially outer surface of the shroud such that the motor rotor has a magnetic field with a geometry designed by computer modeling; and
magnetizing the motor rotor.

2. The method of claim 1, wherein the motor rotor is manufactured using an additive manufacturing process selected from the group consisting of selective laser melting, selective laser sintering, selective electron beam melting, direct metal laser sintering, fused deposition modeling, and combinations thereof.

3. The method of claim 1, wherein the motor rotor is made of a permanently magnetic metal.

4. The method of claim 1, and further comprising:
adjusting the geometry of the magnetic field around the motor rotor by using subtractive manufacturing techniques on the motor rotor.

5. The method of claim 1, wherein additively manufacturing the motor rotor comprises:
additively manufacturing coils and windings within the motor rotor.

6. The method of claim 1, wherein the motor rotor is made of a metal selected from the group consisting of iron, steel, aluminum, nickel, carbon steel, neodymium (NdFeB), cobalt, and combinations thereof.

7. A method of manufacturing a monolithic impeller and motor rotor, the method comprising:
additively manufacturing an impeller with a shroud and a motor rotor on a radially outer surface of the shroud, wherein the motor rotor has a magnetic field with a geometry designed using computer modeling; and
magnetizing the motor rotor.

8. The method of claim 7, and further comprising:
adjusting the geometry of the magnetic field around the motor rotor by using subtractive manufacturing techniques on the motor rotor.

9. The method of claim 7, wherein the impeller, the shroud, and the motor rotor are additively manufactured using a process selected from the group consisting of selective laser melting, selective laser sintering, selective electron beam melting, direct metal laser sintering, fused deposition modeling, and combinations thereof.

10. The method of claim 7, wherein the impeller and the motor rotor are made of a metal selected from the group consisting of iron, steel, aluminum, nickel, carbon steel, neodymium (NdFeB), cobalt, and combinations thereof.

11. A method of manufacturing a shaftless rotary machine, the method comprising:
manufacturing a housing with an inlet, an outlet, and a duct extending from the inlet to the outlet;
additively manufacturing a motor stator on an inner surface of the housing;
manufacturing an impeller with a shroud and a motor rotor on the shroud; and
mounting the impeller in the housing with a clearance between the motor rotor and the motor stator.

12. The method of claim 11, wherein the housing and the motor stator are manufactured using additive manufacturing to form a monolithic housing and motor stator.

13. The method of claim 11, and further comprising:
designing a geometry of a magnetic field around the motor rotor using computer modeling; and
modifying a portion of a radially outer surface of the shroud to prepare the radially outer surface for additive manufacturing;
wherein manufacturing an impeller with a shroud and the motor rotor on the shroud comprises:
additively manufacturing the motor rotor onto a radially outer surface of the shroud.

14. The method of claim 11, and further comprising:
designing a geometry of a magnetic field around the motor rotor using computer modeling;
wherein manufacturing an impeller with a shroud and the motor rotor on the shroud comprises:
additively manufacturing the impeller with the motor rotor on the shroud.

15. The method of claim 11, and further comprising:
magnetizing the motor rotor; and
adjusting the geometry of the magnetic field around the motor rotor by using subtractive manufacturing techniques on the motor rotor.

16. The method of claim 11, wherein the housing and the motor stator, and the impeller, the shroud, and the motor rotor are additively manufactured using a process selected from the group consisting of selective laser melting, selective laser sintering, selective electron beam melting, direct metal laser sintering, fused deposition modeling, and combinations thereof.

17. The method of claim 11, wherein the impeller and the motor rotor are made of a metal selected from the group consisting of iron, steel, aluminum, nickel, carbon steel, neodymium (NdFeB), cobalt, and combinations thereof.

18. The method of claim 11, wherein mounting the impeller into the housing with the clearance between the motor rotor and the motor stator comprises:
orienting a radially inner surface of the motor stator toward a radially outer surface of the motor rotor;
orienting a radially inner surface of the motor rotor toward a radially outer surface of the motor stator; or
orienting a second side of the motor stator toward a first side of the motor rotor.

19. The method of claim 11, and further comprising:
designing a geometry of a magnetic field between the motor rotor and the motor stator using computer modeling.

20. The method of claim 11, and further comprising:
additively manufacturing coils and windings within the motor stator.

* * * * *